United States Patent
Nakajima et al.

(10) Patent No.: US 11,178,328 B2
(45) Date of Patent: Nov. 16, 2021

(54) BLUR CORRECTION DEVICE, INTERCHANGEABLE LENS AND IMAGE-CAPTURING DEVICE

(71) Applicant: NIKON CORPORATION, Tokyo (JP)

(72) Inventors: Daiju Nakajima, Kawasaki (JP); Tsuyoshi Matsumoto, Tokyo (JP); Yoshiko Ono, Kawasaki (JP); Eiji Mikamoto, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/492,809

(22) PCT Filed: Mar. 22, 2018

(86) PCT No.: PCT/JP2018/011493
§ 371 (c)(1),
(2) Date: Jan. 3, 2020

(87) PCT Pub. No.: WO2018/180916
PCT Pub. Date: Oct. 4, 2018

(65) Prior Publication Data
US 2020/0260010 A1    Aug. 13, 2020

(30) Foreign Application Priority Data

Mar. 31, 2017    (JP) .............................. JP2017-072588

(51) Int. Cl.
*H04N 5/232*    (2006.01)
(52) U.S. Cl.
CPC ... *H04N 5/23267* (2013.01); *H04N 5/232121* (2018.08)

(58) Field of Classification Search
CPC .......... H04N 5/23248; H04N 5/23251; H04N 5/23258; H04N 5/23264; H04N 5/23267
(Continued)

(56) References Cited

U.S. PATENT DOCUMENTS

| 9,729,777 B2 * | 8/2017 | Ito ............................ G02B 7/34 |
| 2009/0180770 A1 | 7/2009 | Honjo et al. |

(Continued)

FOREIGN PATENT DOCUMENTS

| CN | 105378555 A | 3/2016 |
| CN | 106164730 A | 11/2016 |

(Continued)

OTHER PUBLICATIONS

Jun. 26, 2018, International Search Report issued in International Patent Application No. PCT/JP2018/011493.

(Continued)

*Primary Examiner* — Anthony J Daniels
(74) *Attorney, Agent, or Firm* — Oliff PLC

(57) ABSTRACT

A blur correction device includes: an input unit to which a blur quantity in at least either an image-capturing optical system or an image sensor that captures a subject image formed via the image-capturing optical system, is input; and a calculation unit that calculates, based upon the blur quantity, a correction quantity for correcting blur in the subject image, wherein: the calculation unit calculates a second correction quantity different from a first correction quantity for correcting blur in the subject image occurring on an optical axis.

16 Claims, 11 Drawing Sheets

(58) Field of Classification Search
USPC .......................................... 348/208.99, 208.6
See application file for complete search history.

(56) References Cited

U.S. PATENT DOCUMENTS

| | | | |
|---|---|---|---|
| 2010/0194897 A1 | 8/2010 | Yumiki | |
| 2011/0001858 A1 | 1/2011 | Shintani et al. | |
| 2011/0008033 A1 | 1/2011 | Ichimiya | |
| 2013/0057734 A1* | 3/2013 | Tachi | H04N 9/04557 |
| | | | 348/242 |
| 2015/0358545 A1 | 12/2015 | Wakamatsu | |
| 2016/0057352 A1* | 2/2016 | Yoneda | H04N 5/23267 |
| | | | 348/208.4 |
| 2016/0127649 A1 | 5/2016 | Tsuchiya | |
| 2016/0173781 A1 | 6/2016 | Tsuchiya | |
| 2016/0261801 A1* | 9/2016 | Horikawa | H04N 5/23212 |
| 2017/0013199 A1 | 1/2017 | Kunugi et al. | |
| 2017/0223259 A1* | 8/2017 | Ito | H04N 5/23287 |
| 2019/0069766 A1* | 3/2019 | Mizukura | G06T 5/003 |
| 2019/0281221 A1* | 9/2019 | Kuwahara | H04N 5/23267 |

FOREIGN PATENT DOCUMENTS

| | | | |
|---|---|---|---|
| JP | H11-101998 A | 4/1999 | |
| JP | 2007-233166 A | 9/2007 | |
| JP | 2007-235806 A | 9/2007 | |
| JP | 2008-197366 A | 8/2008 | |
| JP | 2008-281925 A | 11/2008 | |
| JP | 5061188 B2 | 10/2012 | |
| JP | 5101506 B2 | 12/2012 | |
| JP | 2013-054374 A | 3/2013 | |
| JP | 5404221 B2 | 1/2014 | |
| JP | 2015-233248 A | 12/2015 | |
| JP | 2016-114792 A | 6/2016 | |
| WO | WO-2016088530 A1 * | 6/2016 | ............. G03B 13/36 |

OTHER PUBLICATIONS

Dec. 2, 2020 Office Action issued in Chinese Patent Application No. 201880021967.4.
Jan. 5, 2021 Office Action issued in Japanese Patent Application No. 2018-054969.
Jun. 23, 2021 Office Action issued in Chinese Patent Application No. 201880021967.4.
Sep. 7, 2021 Office Action issued in Japanese Patent Application No. 2018-054969.

* cited by examiner

BLUR CORRECTION DEVICE, INTERCHANGEABLE LENS AND IMAGE-CAPTURING DEVICE

TECHNICAL FIELD

The present invention relates to a blur correction device, an interchangeable lens and an image-capturing device.

BACKGROUND ART

There is a technology known in the related art through which an image blur attributable to camera movement is suppressed (see PTL 1). However, this technology only corrects an image blur in a central area of the image plane.

CITATION LIST

Patent Literature

PTL 1: Japanese Laid Open Patent Publication No. 2007-235806

SUMMARY OF INVENTION

According to the 1st aspect of the present invention, a blur correction device comprises: an input unit to which a blur quantity in at least either an image-capturing optical system or an image sensor that captures a subject image formed via the image-capturing optical system, is input; and a calculation unit that calculates, based upon the blur quantity, a correction quantity for correcting blur in the subject image, wherein: the calculation unit calculates a second correction quantity different from a first correction quantity for correcting blur in the subject image occurring on an optical axis.

According to the 2nd aspect of the present invention, a blur correction device comprises: an input unit to which a blur quantity in at least either an image-capturing optical system or an image sensor that captures a subject image formed via the image-capturing optical system, is input; and a calculation unit that calculates, based upon the blur quantity, an off-axis correction quantity for correcting blur in the subject image occurring at a position off an optical axis.

According to the 3rd aspect of the present invention, an interchangeable lens includes the blur correction device according to the 1st or 2nd aspect.

According to the 4th aspect of the present invention, an image-capturing device includes the blur correction device according to the 1st or 2nd aspect.

DESCRIPTION OF EMBODIMENTS

First Embodiment

Figure 1:
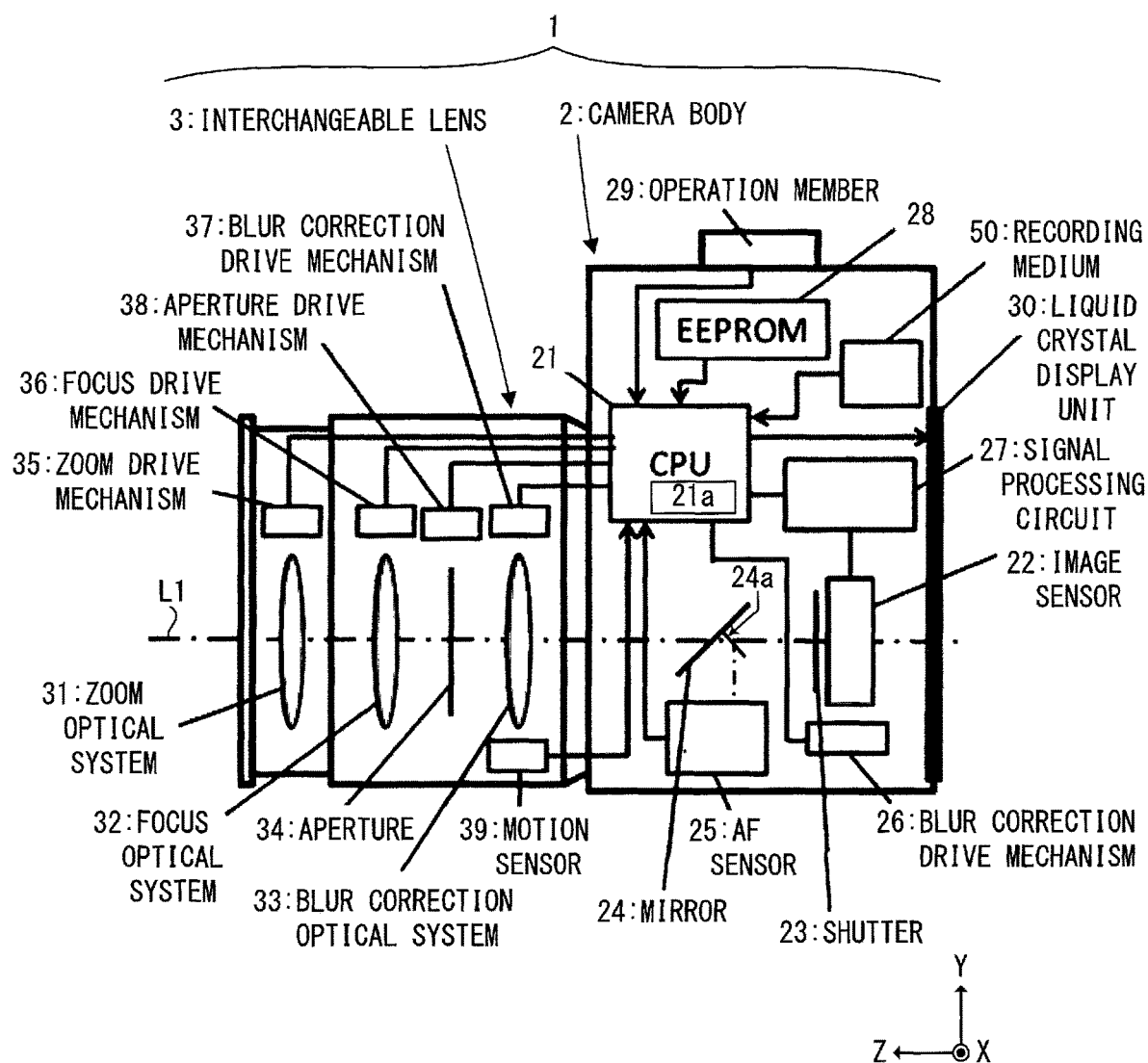
FIG. 1 A diagram illustrating the essential structure of the camera in a first embodiment FIG. 2 A schematic diagram in reference to which the blur correction unit will be explained FIG. 3 An illustration of the angular velocity detection direction and an image blur occurring on the image plane in a schematic presentation FIG. 4 A diagram in reference to which the image blur in FIG. 3 will be explained FIG. 5 An illustration presenting examples of focus areas that may be formed at the imaging screen FIG. 6 A diagram illustrating how a single representative position may be selected from a plurality of candidates FIG. 7 An illustration in reference to which variation 2 of the first embodiment will be explained FIG. 8 An illustration of the angular velocity detection direction and an image blur occurring on the image plane in a schematic presentation FIG. 9 An illustration presenting an example in which distortion has occurred FIG. 10 A diagram illustrating the essential structure of the camera in a third embodiment FIG. 11 A diagram in reference to which a blur correction unit in the interchangeable lens will be explained

In reference to drawings, an image-capturing device having mounted thereat the image blur correction device in the first embodiment will be explained. While the image-capturing device is embodied as a digital camera (hereafter will be referred to as a camera 1) compatible with various lenses in this example, the camera 1 may instead be a single lens reflex camera having a mirror 24 disposed in a camera body 2 or it may be a mirrorless camera that does not include a mirror 24.

In addition, the camera 1 may be configured as a camera having an integrated lens by integrating an interchangeable lens 3 with the camera body 2.

Furthermore, the image-capturing device does not need to be a camera 1, and it may be a lens barrel having installed therein an image-capturing sensor, a smart phone having an image-capturing function, or the like.

Essential Structure of the Camera

FIG. 1 illustrates the essential structure of the camera 1. The camera 1 is configured with a camera body 2 and an interchangeable lens 3. The interchangeable lens 3 is mounted at the camera body 2 via a mount unit (not shown). As the interchangeable lens 3 is mounted at the camera body 2, the camera body 2 and the interchangeable lens 3 become electrically connected, thereby enabling communication between the camera body 2 and the interchangeable lens 3.

It is to be noted that the camera body 2 and the interchangeable lens 3 may communicate with each other through wireless communication.

Light from the photographic subject advances toward the − side along a Z axis in FIG. 1. In addition, the side further toward the person looking at the drawing along an X axis running perpendicular to a Z axis is designated as an X axis + side and the upper side along a Y axis running perpendicular to the Z axis and the X axis is designated as a Y axis + side, with respect to the coordinate axes in the figure. In some of the figures to be referred to below, the coordinate axes are shown so as to clearly indicate the orientations of the individual figures in reference to the coordinate axes in FIG. 1.

Interchangeable Lens

The interchangeable lens 3, which includes an image-capturing optical system (image forming optical system), forms a subject image on an image-capturing surface of an image sensor 22 disposed at the camera body 2. The image-capturing optical system includes a zoom optical system 31, a focus (focus adjustment) optical system 32, a blur correction optical system 33 and an aperture 34. The interchangeable lens 3 further includes a zoom drive mechanism 35, a focus drive mechanism 36, a blur correction drive mechanism 37, an aperture drive mechanism 38, and a motion sensor (motion detection unit, vibration detection unit) 39.

Based upon a signal output from a CPU 21 located in the camera body 2, the zoom drive mechanism 35 adjusts the magnification factor at the image-capturing optical system by causing the zoom optical system 31 to move forward/backward along a direction in which an optical axis L1 extends. The signal output from the CPU 21 includes information indicating the direction along which the zoom optical system 31 is to move, the distance over which the zoom optical system 31 is to move, the speed at which the zoom optical system 31 is to move and the like.

Based upon a signal output from the CPU 21 located in the camera body 2, the focus drive mechanism 36 executes focus adjustment for the image-capturing optical system by causing the focus optical system 32 to move forward/backward along the optical axis L1. The signal output from the CPU 21 for focus adjustment includes information indicating the direction along which the focus optical system 32 is to move, the distance over which the focus optical system 32 is to move, the speed at which the focus optical system 32 is to move and the like.

In addition, based upon a signal output from the CPU 21 located in the camera body 2, the aperture drive mechanism 38 controls the opening diameter at the aperture 34.

Based upon a signal output from the CPU 21 located in the camera body 2, the blur correction drive mechanism 37 suppresses blur (will be referred to as image blur) in the subject image formed at the image-capturing surface of the image sensor 22 by causing the blur correction optical system 33 to move forward/backward along a direction in which the image blur is canceled out within a plane intersecting the optical axis L1. The signal output from the CPU 21 includes information indicating the direction along which the blur correction optical system 33 is to move, the distance over which the blur correction optical system 33 is to move, the speed at which the blur correction optical system 33 is to move and the like.

The motion sensor 39 detects vibration of the camera 1 when the camera 1 is caused to vibrate due to hand movement or the like. The motion sensor 39 is configured with an angular velocity sensor 39a and an acceleration sensor 39b. It is assumed that image blur is caused by movement of the camera 1.

The angular velocity sensor 39a detects an angular velocity caused by a rotational motion of the camera 1. The angular velocity sensor 39a individually detects rotation around, for instance, an axis running parallel to the X axis, an axis running parallel to the Y axis and an axis running parallel to the Z axis and provides a detection signal to the CPU 21 at the camera body 2. The angular velocity sensor 39a may be otherwise referred to as a gyro sensor.

In addition, the acceleration sensor 39b detects acceleration that occurs due to a translational motion of the camera 1. The acceleration sensor 39b individually detects acceleration along, for instance, an axis running parallel to the X axis, an axis running parallel to the Y axis and an axis running parallel to the Z axis and provides a detection signal to the CPU 21 at the camera body 2. The acceleration sensor 39b may be otherwise referred to as a G sensor.

While the motion sensor 39 is disposed at the interchangeable lens 3 in this example, the motion sensor 39 may instead be disposed at the camera body 2. Furthermore, a motion sensor 39 may be disposed both at the camera body 2 and at the interchangeable lens 3.

Camera Body

The CPU 21, the image sensor 22, a shutter 23, a mirror 24, an AF sensor 25, a blur correction drive mechanism 26, a signal processing circuit 27, a memory 28, an operation member 29 and a liquid crystal display unit 30 are disposed at the camera body 2.

The CPU 21, configured with a CPU, a RAM (random access memory), a ROM (read only memory) and the like, controls various components of the camera 1 based upon a control program. The CPU 21 includes a correction unit (correction quantity calculation unit) 21a.

The blur correction unit 21a calculates an image blur occurring as the camera 1 undergoes a rotational motion or a translational motion. Based upon the results of an arithmetic operation executed by the blur correction unit 21a, the CPU 21 causes the blur correction optical system 33 to move via the blur correction drive mechanism (blur correction drive unit) 37 or causes the image sensor 22 to move via the blur correction drive mechanism (blur correction drive unit) 26.

In the first embodiment, the extent of image blur is minimized by moving the blur correction optical system 33 at the interchangeable lens, which constitutes the image-capturing optical system, or by moving the image sensor 22. Such image blur suppression may be otherwise referred to as image blur correction. Image blur correction will be explained in detail later.

The image sensor 22 in FIG. 1 is constituted with a CCD image sensor or a CMOS image sensor. The image sensor 22 receives a light flux, having passed through the image-capturing optical system, at the image-capturing surface thereof and executes photoelectric conversion of the subject image (captures an image). Through the photoelectric conversion, an electric charge is generated in correspondence to the amount of light received at each of a plurality of pixels disposed at the image-capturing surface of the image sensor 22. A signal generated based upon the electric charge thus generated is read out from the image sensor 22 and is provided to the signal processing circuit 27.

The length of exposure time at the image sensor 22 is controlled via the shutter 23. It is to be noted that the exposure time at the image sensor 22 can also be controlled by controlling the length of time over which electric charges are accumulated at the image sensor 22 (through the method widely known as electronic shutter control). The shutter 23 is driven to open/close by a shutter drive unit (not shown).

The semi-transmissive quick-return mirror (hereafter referred to as the mirror) 24, driven by a mirror drive unit (not shown), moves between a down position (such as that shown in FIG. 1) at which the mirror 24 is located on the optical path, and an up position at which the mirror 24 is set outside the optical path. Prior to a shutter release, for instance, subject light is reflected by the mirror 24 set at the down position toward a viewfinder unit (not shown) disposed in an upper position (toward the Y axis + side). In addition, part of the subject light having been transmitted through the mirror 24 is deflected downward (toward the Y axis − side) via a sub-mirror 24a and is guided to the AF sensor 25.

Immediately after the shutter release switch is pressed down, the mirror 24 is rotated to the up position. As a result, subject light is guided to the image sensor 22 via the shutter 23.

The AF sensor 25 detects the focusing condition achieved via the image-capturing optical system at the interchangeable lens 3. The CPU 21 executes a focus detection calculation through a phase method of the known art by using a detection signal provided by the AF sensor 25. The CPU 21 determines a defocus quantity representing the extent of defocus at the image-capturing optical system through this calculation and then calculates a distance over which the focus optical system 32 is to move based upon the defocus quantity. The CPU 21 transmits the distance over which the focus optical system 32 is to move, having been calculated as described above, to the focus drive mechanism 36 together with the direction along which the focus optical system 32 is to move and the speed at which the focus optical system 32 is to move.

Based upon a signal output from the CPU 21, the blur correction drive mechanism 26 suppresses an image blur at the image-capturing surface of the image sensor 22 by causing the image sensor 22 to move forward/backward within a plane intersecting the optical axis L1 along a direction in which the image blur is canceled out. The signal output from the CPU 21 includes information indicating the direction along which the image sensor 22 is to move, the distance over which the image sensor 22 is to move, the speed at which the image sensor 22 is to move and the like.

The signal processing circuit 27 generates image data pertaining to the subject image based upon image signals read out from the image sensor 22. In addition, the signal processing circuit 27 executes specific image processing on the image data thus generated. The specific image processing includes image processing of the known art, such as gradation conversion processing, color interpolation processing, edge enhancement processing and white balance processing.

The memory 28 may be constituted with, for instance, an EEPROM (electrically erasable programmable read only memory), a flash memory or the like. Adjustment value information indicating, for instance, a detection gain to be set in the motion sensor 39 and the like is recorded in the memory 28. Data are recorded into and read out from the memory 28 by the CPU 21.

The operation member 29, which includes a shutter release button, a record button, a live-view button and various types of setting switches, outputs an operation signal corresponding to a specific operation to the CPU 21.

In response to an instruction issued by the CPU 21, an image based upon image data, information pertaining to photographing operations such as, for instance, the shutter speed and the aperture value, a menu operation screen or the like is brought up on display at the liquid crystal display unit 30.

A recording medium 50 is constituted with, for instance, a memory card that can be detachably mounted at the camera body 2. Image data, audio data and the like are recorded into the recording medium 50. Data are recorded into and read out from the recording medium 50 by the CPU 21.

Image Blur Correction

The camera 1 in the first embodiment is configured so that image blur correction can be executed by engaging the blur correction drive mechanism 37 at the interchangeable lens 3 in operation and by engaging the blur correction drive mechanism 26 at the camera body 2 in operation. In the first embodiment, the CPU 21 engages either of these blur correction drive mechanisms in operation. For instance, when an interchangeable lens 3 having the blur correction drive mechanism 37 is mounted at the camera body 2, the CPU 21 executes image blur correction by engaging the blur correction drive mechanism 37 at the interchangeable lens 3 in operation, whereas when an interchangeable lens 3 without a blur correction drive mechanism 37 is mounted at the camera body 2, the CPU 21 executes image blur correction by engaging the blur correction drive mechanism 26 at the camera body 2 in operation.

It is to be noted that as will be explained later in reference to the third embodiment, the blur correction drive mechanisms at the interchangeable lens 3 and the camera body 2 may be engaged in operation simultaneously.

In general, an image blur occurring in the camera 1 is attributed to an image blur occurring as the camera 1 undergoes a rotational motion (may otherwise be referred to as an angular blur) and to an image blur occurring as the camera 1 undergoes a translational motion (may otherwise be referred to as a translational blur). The blur correction unit 21a individually calculates the image blur due to a rotational motion of the camera 1 and the image blur due to a translational motion of the camera 1.

Figure 2:
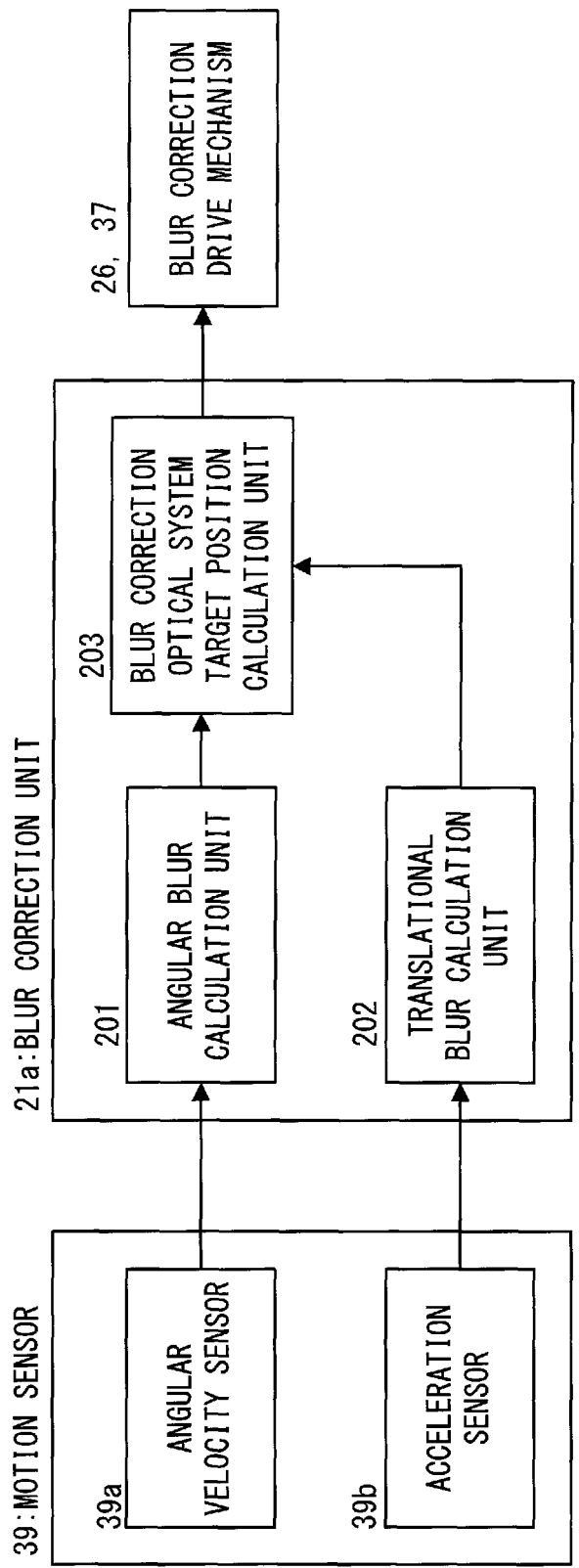

FIG. 2 illustrates the blur correction unit 21a. The blur correction unit 21a includes an angular blur calculation unit 201, a translational blur calculation unit 202 and a blur correction optical system target position calculation unit (selection unit) 203.

The angular blur calculation unit 201 calculates an image blur occurring along the Y axis due to a rotational motion by using a detection signal provided by the angular velocity sensor 39a, indicating a rotational motion around an axis extending parallel to the X axis (along the pitch direction). In addition, the angular blur calculation unit 201 calculates an image blur occurring along the X axis due to a rotational motion by using a detection signal provided by the angular velocity sensor 39a, indicating a rotational motion around an axis extending parallel to the Y axis (along the yaw direction).

The translational blur calculation unit 202 calculates an image blur occurring along the X axis due to a translational motion by using a detection signal provided by the acceleration sensor 39b, indicating an acceleration along the X axis. In addition the translational blur calculation unit 202 calculates an image blur occurring along the Y axis due to a translational motion by using a detection signal provided by the acceleration sensor 39b, indicating an acceleration along the Y axis.

The blur correction optical system target position calculation unit 203 adds together the image blurs along the X axis and the Y axis, having been calculated by the angular blur calculation unit 201, and the image blurs along the X axis and the Y axis, having been calculated by the translational blur calculation unit 202, individually in correspondence to the X axis and the Y axis, so as to calculate image blurs along the X axis and along the Y axis. For instance, if the direction of the image blur calculated by the angular blur calculation unit 201 along a given axis matches the direction of the image blur calculated by the translational blur calculation unit 202 along the same axis, the image blurs added together will result in a greater sum, whereas if the directions of the two image blurs are different, the image blurs added together will result in a smaller sum. In other words, the adding operation is executed by appending a positive or negative sign to each image blur present along a given axis in correspondence to its direction.

Next, the blur correction optical system target position calculation unit 203 calculates an image blur quantity representing the quantity of image blur occurring at a predetermined position on the image plane (the image-capturing surface of the image sensor 22) based upon the image blur sums along the X axis and the Y axis resulting from the adding operation, the photographic magnification factor (calculated based upon the position of the zoom optical system 31) and the distance from the camera 1 to a subject 80 (calculated based upon the position of focus optical system 32).

When executing image blur correction by engaging the blur correction drive mechanism 37 at the interchangeable lens 3 in operation, the blur correction optical system target position calculation unit 203 calculates a target position to which the blur correction optical system 33 is to move so as to cancel out the image blur quantity having been calculated.

In addition, when executing image blur correction by engaging the blur correction drive mechanism 26 at the camera body 2 in operation, the blur correction optical system target position calculation unit 203 calculates a target position toward which the image sensor 22 is to move so as to cancel out the image blur quantity having been calculated.

The blur correction optical system target position calculation unit 203 then outputs a signal indicating the target position to the blur correction drive mechanism 37 at the interchangeable lens 3 or to the blur correction drive mechanism 26 at the camera body 2.

It is to be noted that the blur correction optical system target position calculation unit 203 is able to individually output signals indicating the respective target positions to the blur correction drive mechanisms at the interchangeable lens 3 and the camera body 2.

In addition, if the target position transmitted from the camera body 2 is outside the range over which the blur correction drive mechanism 37 at the interchangeable lens 3 is able to move, the blur correction drive mechanism 37 may notify the CPU 21 at the camera body 2 of the fact that the target position is outside the range of movement. In response, the CPU 21 will be able to take measures, such as, for instance, issuing an alarm so as to indicate that the quantity of image blur is beyond the image blur correction allowable range.

Image Blur at a Predetermined Position

The image blur calculation executed by the angular blur calculation unit 201 will be described in further detail. In the first embodiment, the angular blur calculation unit 201 engaged in calculation of an image blur caused by a rotational motion of the camera 1 sets a position on the image plane (the image-capturing surface at the image sensor 22) in advance and calculates the image blur at this position. The reason for setting such a predetermined position is that an image blur occurs to varying extents at different positions on the image plane even in correspondence to a given rotational angle of a rotational motion.

Figure 3:
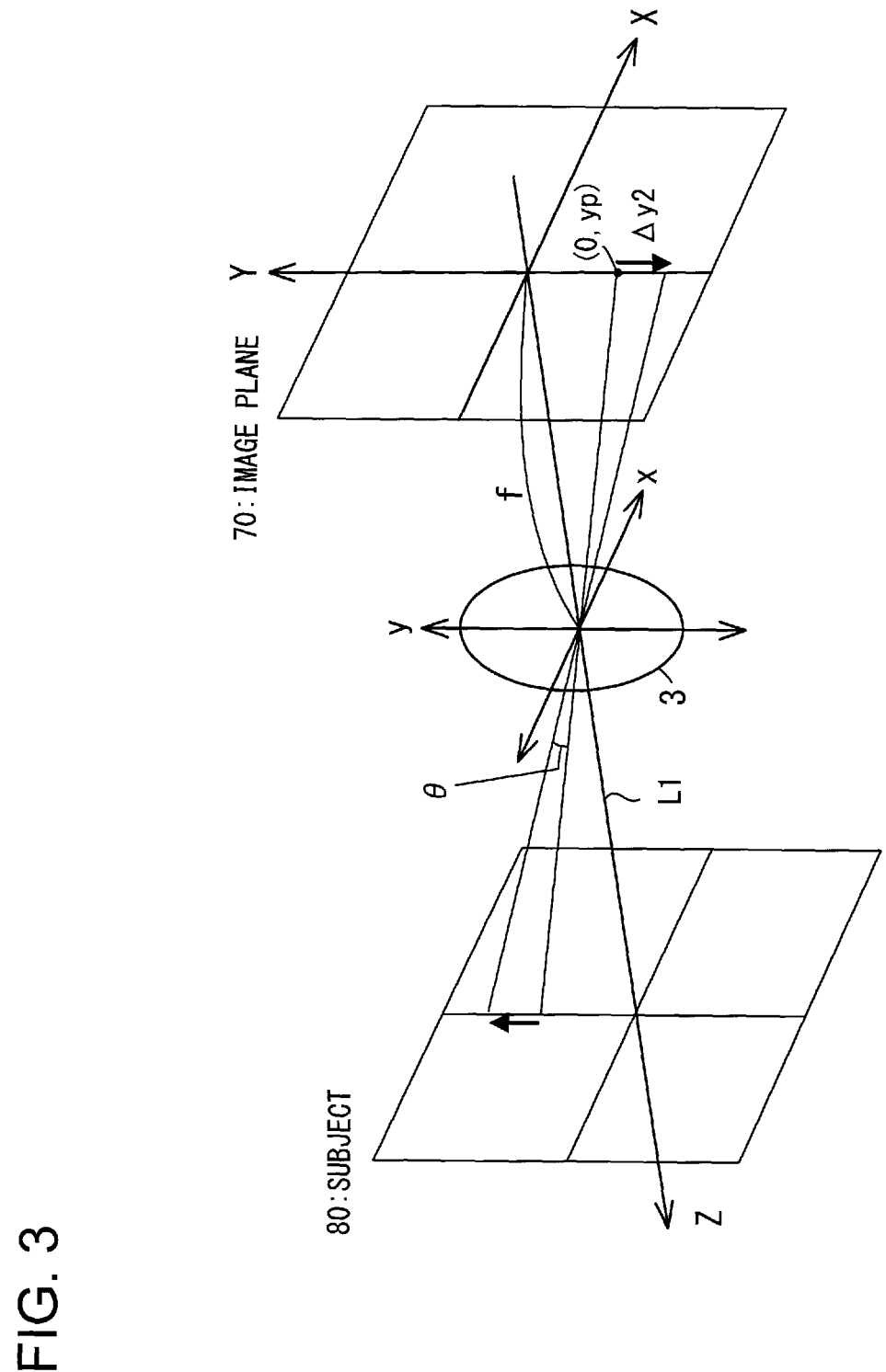
Figure 4:
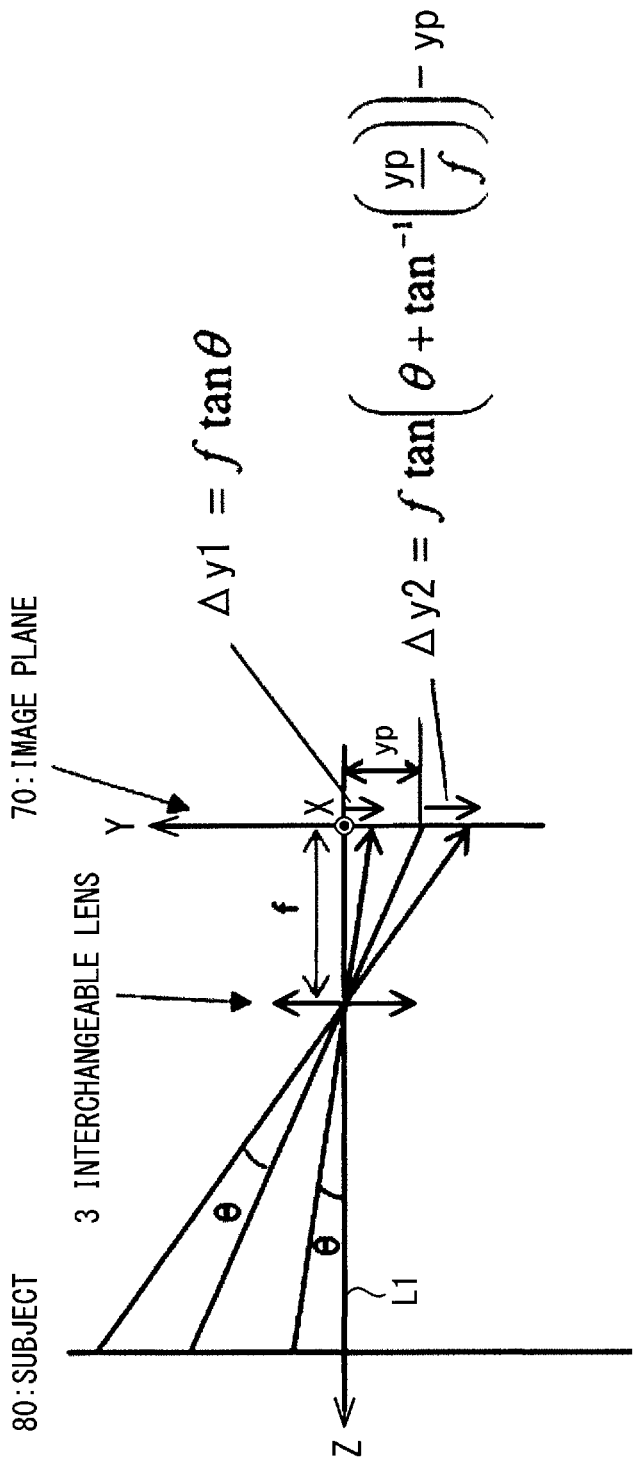

FIG. 3 illustrates the direction along which the angular velocity is detected by the angular velocity sensor 39a and an image blur occurring at an image plane 70 (the image-capturing surface of the image sensor 22) in a schematic representation. In FIG. 3, the point at which the image plane 70 and the optical axis L1 of the interchangeable lens 3 intersect is designated as the origin point of the coordinate system, with the Z axis representing the optical axis L1 of the interchangeable lens 3 and the XY plane representing the image plane 70. FIG. 3 shows that the optical axis L1 intersects the image-capturing surface at the center thereof. The interchangeable lens 3 and the subject 80 are located at positions further on the Z axis + side relative to the image plane 70. The angular velocity sensor 39a detects a rotational angle θ around, for instance, an axis (small-x axis) parallel to the X axis (along the pitch direction). When the subject 80 is located at a remote position, the reference sign f in FIGS. 3 and 4 represents the focal length.

As the camera 1 moves, the image of the photographic subject 80, having been located at a coordinate point (0, yp) on the image plane 70 prior to the movement, shifts toward the Y axis − side. The position of the image of the photographic subject 80 following the shift is at a coordinate point (0, yp−Δy2). FIG. 4, in reference to which an image blur Δy2 in FIG. 3 will be explained, provides a representation of the YZ plane in FIG. 3.

The image blur Δy2 can be expressed as a mathematical equation (1) below.

$$\Delta y2 = f \times \tan(\theta + \tan^{-1}(yp/f)) - yp \quad (1)$$

It is to be noted that θ represents the rotational angle along the pitch direction (representing the angle of a hand movement, which is normally approximately 0.5°). When the subject 80 is located at a remote position, the reference sign f in FIGS. 3 and 4 represents the focal length of the interchangeable lens 3.

The image blur in equation (1) is compared with an image blur Δy1 in the image of the subject 80 located at the coordinate point (0, 0) at the center of the image plane 70, captured before the camera 1 moves. It is to be noted that the angle of rotation of the interchangeable lens 3 along the pitch direction is also assumed to be θ, mentioned above. As the camera 1 moves, the image of the subject 80 located at the coordinate point (0, 0) on the image plane 70 prior to the movement shifts toward the Y axis − side. The image of the subject 80 having shifted takes the position at a coordinate point (0, −Δy1).

The image blur Δy1 can be expressed as a mathematical equation (2) below.

$$\Delta y1 = f \times \tan \theta \quad (2)$$

Equations (1) and (2) above indicate that since the rotational angle θ (hand movement angle) is normally approximately 0.5°, Δy1 and Δy2 can be assumed to be approximately equal to each other (Δy1≈Δy2) as long as the focal length f is sufficiently large in comparison to yp. In other words, the quantity of image blur can be considered to be substantially constant regardless of whether the position of the image of the subject 80 on the image plane 70 is at the center (the origin point in this example) of the image plane 70 or the position of the image of the subject 80 is away from the center, i.e., even over varying distances from the optical axis L1. This means that the image blur may be calculated in correspondence to any position on the image plane 70. In this case, by executing image blur correction based upon an image blur calculated at, for instance, the center of the image plane 70, the image blur in the image of the subject 80 at the center of the image plane 70 and an image blur in an image of the subject 80 at a position set apart from the center of the image plane 70 can both be corrected.

However, if the focal length f is not sufficiently large in comparison to yp, which may be the case when the interchangeable lens 3 is a wide-angle lens, Δy1<Δy2. Under such circumstances, it will be necessary to calculate an image blur by selecting a specific position on the image plane 70, since, if image blur correction is executed based upon, for instance, an image blur calculated at the center of the image plane 70, an image blur equivalent to the difference between Δy2 and Δy1 will remain in the image of the subject 80 at a position set apart from the center of the image plane 70 even though the image blur in the image of the subject 80 at the center of the image plane 70 is suppressed. The difference between Δy2 and Δy1 is bound to increase as the position at which the image blur is calculated moves toward the periphery of the image plane 70, i.e., as the image height increases.

Image Blur Calculation Position

In a majority of cases, the user desires to address image blur occurring in the image of a primary subject among subjects 80 to be photographed. Accordingly, the CPU 21 in the first embodiment selects a position on the image plane 70 likely to be the location of the image of the primary subject. Then, the angular blur calculation unit 201 calculates the quantity of image blur in correspondence to the position selected by the CPU 21 and executes image blur correction based upon the image blur thus calculated.

The CPU 21 selects one of methods (1) through (3) below as the method to be adopted when determining the image blur calculation position. If the camera 1 is detected to have moved due to, for instance, a compositional change after the image blur calculation position has been determined, the CPU 21 resets (updates) the image blur calculation position. The motion sensor 39 also functions as a motion quantity detection unit.

(1) Focus Area Position

Figure 5:
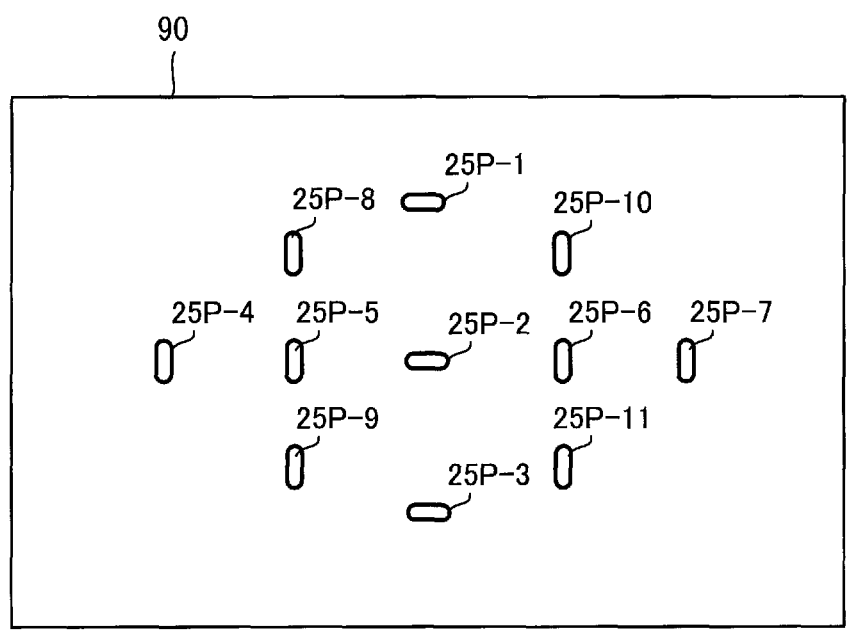

In the first method, an image blur at a focus area position is calculated. FIG. 5 presents examples of focus areas formed at an imaging screen 90. A focus area in which the AF sensor 25 detects the focusing condition may be otherwise referred to as a focus detection area, a range finding point or an autofocus (AF) point. In the first embodiment, 11 focus areas 25P-1 through 25P-11 are set in advance in the imaging screen 90. The CPU 21 is able to determine defocus quantities in the 11 focus areas.

It is to be noted that the number of focus areas 25P-1 through 25P-11 described above is simply an example and a greater or smaller number of focus areas may be set.

The CPU 21 sets a position corresponding to a selected focus area as a position on the image plane 70 at which an image blur is to be calculated. The angular blur calculation unit 201 then calculates the image blur at the position set by the CPU 21 and executes image blur correction based upon the image blur thus calculated. On the image plane 70, the position corresponding to the selected focus area is set as the image blur calculation position, since a primary subject is likely to be present at the position in correspondence to which a defocus quantity is determined for purposes of focus adjustment.

It is to be noted that a focus area may be selected by the CPU 21 based upon an operation signal provided via the operation member 29 or a focus area corresponding to a subject 80 located close to the camera 1 may be selected by the CPU 21. The CPU 21 is able to select a focus area corresponding to a subject 80 located close to the camera 1 based upon, for instance, the position of the focus optical system 32.

In addition, the CPU 21 may select a focus area corresponding to a subject 80 with high contrast among images of subjects 80, or may select a focus area corresponding to a subject 80 with a high luminance value among images of subjects 80.

(2) Subject Position

In the second method, a quantity of image blur at the position taken by a photographed object (subject 80) is calculated. The CPU 21 recognizes an object captured as a subject 80 in, for instance, a live-view image through object recognition processing of the known art and designates the position taken by the object (subject 80) in the live-view image as a primary subject position. It then sets the position corresponding to the primary subject as the position on the image plane 70 at which an image blur is to be calculated. The angular blur calculation unit 201 calculates the image blur at the position set by the CPU 21 and executes image blur correction based upon the image blur thus calculated.

A live-view image is a monitor image obtained via the image sensor 22 over predetermined intervals (e.g., 60 fps) prior to a main image-capturing operation. In response to, for instance, an operation of a live-view button constituting part of the operation member 29, the CPU 21 engages the image sensor 22 in operation to start obtaining the live-view image while keeping the mirror 24 at the up position. The CPU 21 is able to bring up the live-view image on display at the liquid crystal display unit 30.

The CPU 21 is also able to track a moving object (subject 80) by sequentially updating the position of the primary subject based upon individual frames of the live-view image. In such a case, the angular blur calculation unit 201 calculates the quantity of image blur each time the primary subject position is updated by the CPU 21 so as to execute image blur correction for the moving object (subject 80) in the live-view image being obtained.

In addition, when the camera 1 is yawed for a panning shot, too, the CPU 21 is able to track a moving object (subject 80) by updating, in sequence, the position taken by the primary subject in each frame of the live-view image.

The CPU 21 may select the second method when, for instance, the camera 1 is set in an image-capturing scene mode such as "landscape", "cooking", "flowers" or "animal" and start object recognition processing. Furthermore, the target for object recognition may be switched in correspondence to the image-capturing scene mode, such as "landscape", "cooking", "flowers" or "animal", set in the camera 1.

(3) Face Position

In the third method, an image blur at the position taken by a photographed face (subject 80) is calculated. The CPU 21 recognizes a face captured as a subject 80 in, for instance, a live-view image through face recognition processing of the known art and designates the position taken by the face in the live-view image as a primary subject position. It then sets the position corresponding to the primary subject as the position on the image plane 70 at which an image blur is to be calculated. The angular blur calculation unit 201 calculates the image blur at the position set by the CPU 21 and executes image blur correction based upon the quantity of image blur thus calculated.

In response to, for instance, an operation of the live-view button constituting part of the operation member 29, the CPU 21 engages the image sensor 22 in operation to start obtaining the live-view image while keeping the mirror 24 at the up position.

The CPU 21 is also able to track a moving face (subject 80) by sequentially updating the position of the primary subject based upon individual frames of the live-view image, as in the method (2) described above. The angular blur calculation unit 201 calculates the image blur each time the primary subject position is updated by the CPU 21 so as to execute image blur correction for the moving face (subject 80) in the live-view image being obtained.

The CPU 21 may select the third method when, for instance, the camera 1 is set in an image-capturing scene mode "portrait" and start face recognition processing.

When there are a Plurality of Image Blur Calculation Positions

Through the methods (1) through (3) described above, a single image blur calculation position is set on the image plane 70. However, a plurality of positions may be image blur calculation position candidates, as will be explained below. More specifically, a plurality of focus areas may be selected in the method (1), a plurality of objects (subjects 80) may be recognized in the method (2) or a plurality of faces may be recognized in the method (3). Under these circumstances, the CPU 21 selects a method (4) or (5) described below.

(4) Selecting a Single Representative Position

Figure 6:
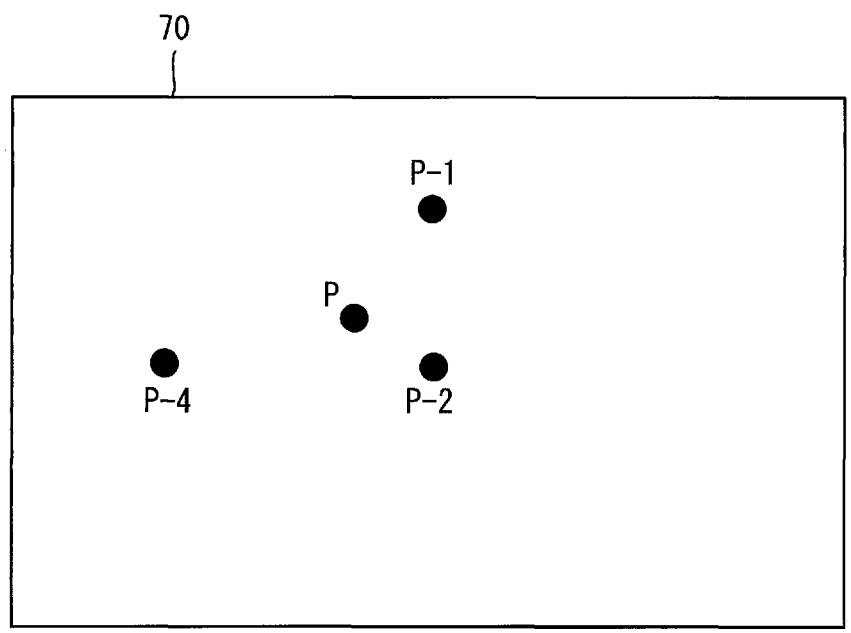

In the fourth method, an image blur is calculated in correspondence to a single representative position. In the example presented in FIG. 6, a single representative position, derived from a plurality of candidates, is selected. There may be, for instance, three candidate positions on the image plane 70, i.e., a position P-1, a position P-2 and a position P-4 respectively corresponding to the focus area 25P-1, the focus area 25P-2 and the focus area 25P-4 in FIG. 5. In this situation, the CPU 21 determines a position P representing an average of the plurality of candidate positions based upon the absolute values of the distances between the plurality of candidate positions and the X axis (see FIG. 3) and the absolute values of the distances between the plurality of candidate positions and the Y axis (see FIG. 3), and designates the position P as a representative position. It then sets the representative position P as the image blur calculation position on the image plane 70. In other words, it determines the representative position P based upon the averages of the absolute values representing distances along the axes (the X axis and the Y axis) on the image plane 70.

The angular blur calculation unit 201 calculates an image blur at the representative position P and executes image blur correction based upon the image blur thus calculated.

While the method (4) has been explained above in reference to an example in which a plurality of focus areas are selected, a representative position may be selected in the same way when a plurality of objects (subjects 80) are recognized or a plurality of faces are recognized. The CPU 21 will select a representative position P as described above based upon the positions of the plurality of objects that have been recognized or based upon the positions of a plurality of faces that have been recognized. The angular blur calculation unit 201 then calculates an image blur at the representative position P set by the CPU 21 and execute image blur correction based upon the quantity of image blur thus calculated.

(5) Calculating a Single Image Blur Quantity

In the fifth method, a single image blur is calculated based upon a plurality of image blurs. In the example presented in FIG. 6, there are three candidate positions on the image plane 70, i.e., the position P-1, the position P-2 and the position P-4 respectively corresponding to the focus area 25 P-1, the focus area 25 P-2 and the focus area 25 P-4 in FIG. 5.

The CPU 21 designates each of the plurality of positions as an image blur calculation position on the image plane 70. The angular blur calculation unit 201 individually calculates image blurs at the position P-1, the position P-2 and the position P-4 on the image plane 70. The angular blur calculation unit 201 further calculates the average of the plurality of image blurs having been calculated and executes image blur correction based upon the image blur average value.

While the image blur average value may be calculated as, for instance, a simple average, it may instead be calculated as a weighted average.

While the method (5) has been explained above in reference to an example in which a plurality of focus areas are selected, image blurs may be calculated in the same way when a plurality of objects (subjects 80) are recognized or a plurality of faces are recognized. For instance, the CPU 21 will designate the positions taken by a plurality of objects having been recognized or the positions taken by a plurality of faces having been recognized as image blur calculation positions on the image plane 70. The angular blur calculation unit 201 will individually calculate image blurs in correspondence to these positions on the image plane 70. The angular blur calculation unit 201 will further calculate the average of the plurality of image blurs having been calculated and will then execute image blur correction based upon the image blur average value.

It is to be noted that a single subject among a plurality of subjects may be selected as a variation of the method (4). For instance, a subject exhibiting a great extent of image blur, among a plurality of photographic subjects, may be selected. As an alternative, a subject exhibiting a great extent of image blur, which is located at a position close to the camera 1, among a plurality of subjects, may be selected. As a further alternative, a subject achieving a great image height, measured from the optical axis L1 of the interchangeable lens 3, among a plurality of subjects, may be selected.

It is to be noted that the image blur correction executed in the first embodiment includes correction along the Y axis executed when the camera 1 rotates along the pitch direction and correction along the X axis executed when the camera 1 rotates along the yaw direction.

The explanation has been given above in reference to the first embodiment on correction along the Y axis executed when the camera 1 has rotated along the pitch direction, as an example representing the image blur correction executed in the first embodiment. If the camera 1 has also rotated along the yaw direction, correction similar to that described above needs to be executed along the X axis, as well. Since correction along the Y axis executed when the camera 1 has rotated along the pitch direction and correction along the X axis executed when the camera 1 has rotated along the yaw direction are similar except for the directions along which the correction is executed, an explanation of the correction executed along the X axis will not be provided.

It is to be noted that image blur calculated by the translational blur calculation unit 202 is assumed to be substantially constant regardless of which position is set on the image plane 70 (the image-capturing surface of the image sensor 22) in the first embodiment.

The first embodiment may be summarized as below.

The angular blur calculation unit 201 calculates an image blur by setting a position on the image plane 70 as an image blur calculation position.

The translational blur calculation unit 202 calculates an image blur by setting, for instance, the center of the image plane 70 as an image blur calculation position.

The blur correction optical system target position calculation unit 203 executes an adding operation to add together the image blurs calculated by the angular blur calculation unit 201 and the image blurs calculated by the translational blur calculation unit 202 by appending +/− signs in correspondence to the directions taken along the X axis and the Y axis. It then calculates an image blur quantity representing the quantity of image blur at the particular position on the image plane 70 based upon the image blur sums along the X axis and along the Y axis resulting from the adding operation.

The following advantages and operations are achieved through the first embodiment described above.

(1) The blur correction device in the camera 1 includes a motion sensor 39 that detects movement of the camera 1, a blur correction unit 21a that calculates an extent of blur in an image of a subject 80 formed at an image plane 70 via an image-capturing optical system based upon an output from the motion sensor 39, and a CPU 21 that determines a designated position on the image plane 70. The blur correction unit 21a calculates an image blur Δy2 along the Y axis based upon the designated position determined by the CPU 21 and movement along, for instance, the Y axis detected by the motion sensor 39. As a result, image blur can be suppressed in an optimal manner even when the designated position on the image plane 70 determined by the CPU 21 is different from the center of the image plane 70, which intersects the optical axis L1. Image blur correction can be ideally executed when the focal length f of the interchangeable lens 3 is small (or when the field angle is wide, depending upon the relationship between the size of the image sensor 22 and the focal length f).

(2) Since the blur correction unit 21a in the blur correction device described in (1) above calculates a greater blur quantity when the distance from an axis extending along the X axis intersecting the Y axis to the designated position measured on the image plane 70, is greater, optimal image blur suppression can be achieved even for an image formed at a position at a significant image height.

(3) The blur correction unit 21a in the blur correction device described in (2) above calculates a blur quantity based upon an output provided by the motion sensor 39, the distance described above and the focal length of the image-capturing optical system, and thus, optimal image blur suppression can be achieved even when an interchangeable lens 3 having a different focal length f is mounted.

(4) The CPU 21 in the blur correction device described in (1) through (3) above selects the position taken by a focus area which is a target of focus adjustment for the image-capturing optical system on the image plane 70 as the designated position and as a result, optimal image blur suppression is achieved at a position at which the primary subject is likely to be present.

(5) The CPU 21 in the blur correction device described in (1) through (3) above determines the designated position based upon subject image contrast information and thus, optimal image blur suppression is achieved at a position at which a primary subject is likely to be present.

(6) The CPU 21 in the blur correction device described in (1) through (3) above determines the designated position based upon luminance value information pertaining to images of subjects 80 and thus, optimal image blur suppression is achieved at a position at which the primary subject is likely to be present.

(7) The CPU 21 in the blur correction device described in (1) through (3) above determines the designated position based upon subject recognition information derived from to images of subjects 80 and thus, optimal image blur suppression is achieved at a position at which a primary subject is likely to be present.

(8) The CPU 21 in the blur correction device described in (1) through (3) above determines the designated position based upon face recognition information derived from to images of subjects 80 and thus, optimal image blur suppression is achieved at a position at which a primary subject is likely to be present.

(9) The CPU 21 in the blur correction device described in (4) through (8) above determines the designated position in correspondence to the current image-capturing scene mode and thus, optimal image blur suppression is achieved at a position at which a primary subject is likely to be present.

(10) The CPU 21 in the blur correction device described in (1) through (3) above selects a position on the image plane 70 specified through a user operation as the designated position, and thus, optimal image blur suppression is achieved at a position desired by the user.

(11) The CPU 21 in the blur correction device described in (1) through (3) above selects a position corresponding to, for instance, a subject 80 located at a position close to the camera 1 as the designated position based upon photographic distance information, and as a result, optimal image blur suppression is achieved at a position corresponding to a primary subject.

(12) The blur correction device described in (1) through (3) above includes a CPU 21 that detects an extent of motion attributable to a compositional change based upon an output provided by the motion sensor 39 and if the CPU 21 detects an extent of motion after the CPU 21 determines the designated position as described above, the blur correction unit 21b calculates a blur quantity based upon an updated designated position resulting from adjustment made based upon the extent of motion. Through these measures, optimal image blur suppression is achieved at a position at which a primary subject is likely to be present following the compositional change.

(13) If there are a plurality of focus areas to be targeted for focus adjustment for the image-capturing optical system, the CPU 21 in the blur correction device described in (4) above selects a gravitational center (representative position P) of the absolute values representing the distances along axes (the X axis and the Y axis) on the image plane 70 as the designated position based upon the positions of the plurality of focus areas. As a result, optimal image blur suppression is achieved so as to substantially equalize extents of image blur at the positions taken by the plurality of focus areas.

(14) If the subject recognition information indicates that there are a plurality of subjects, the CPU 21 in the blur correction device described in (7) above selects the gravitational center (representative position P) of the absolute values of the distances measured on the axes (the X axis and the Y axis) on the image plane 70 as the designated position based upon the positions taken by the plurality of subjects. As a result, optimal image blur suppression is achieved so as to substantially equalize the extents of image blur at the positions taken by the plurality of subjects.

(15) If the face recognition information indicates that there are a plurality of faces, the CPU 21 in the blur correction device described in (8) above selects the gravitational center (representative position P) of the absolute values of the distances measured on the axes (the X axis and the Y axis) on the image plane 70 as the designated position based upon the positions taken by the plurality of faces. As a result, optimal image blur suppression is achieved so as to substantially equalize extents of image blur at the positions taken by the plurality of faces.

(16) When there are a plurality of focus areas to be targeted for focus adjustment for the image-capturing optical system, the CPU 21 in the blur correction device described in (4) above selects the positions of the plurality of focus areas as designated positions and the blur correction unit 21b calculates an average value of a plurality of blurs calculated in correspondence to the plurality of designated positions. Through these measures, optimal image blur suppression is achieved so as to substantially equalize the extents of image blur at the positions taken by the plurality of focus areas.

(17) If the subject recognition information indicates that there are a plurality of primary subjects, the CPU 21 in the blur correction device described in (7) above selects the positions taken by the plurality of primary subjects as designated positions and the blur correction unit 21b calculates an average value of a plurality of blurs calculated in correspondence to the plurality of designated positions. Through these measures, optimal image blur suppression is achieved so as to substantially equalize the extents of image blur at the positions taken by the plurality of focus areas.

(18) If the face recognition information indicates that there are a plurality of faces, the CPU 21 in the blur correction device described in (8) above selects the positions taken by the plurality of faces as designated positions and the blur correction unit 21b calculates an average value of a plurality of blurs calculated in correspondence to the plurality of designated positions. Through these measures, optimal image blur suppression is achieved so as to substantially equalize the extents of image blur at the positions taken by the plurality of focus areas.

The following variations are also within the scope of the present invention, and one of the variations or a plurality of variations may be adopted in combination with the embodiment described above or in combination with an embodiment to be described later.

Variation 1

In the first embodiment described above, the camera 1 executes image blur correction by engaging the blur correction drive mechanism 37 at the interchangeable lens 3 in operation. As an alternative, the camera 1 executes image blur correction by engaging the blur correction drive mechanism 26 at the camera body 2 in operation in variation 1 of the first embodiment. The image blur correction in variation 1 of the first embodiment can be executed in the same way as that in the first embodiment to achieve advantages and operations similar to those of the first embodiment.

Variation 2

When an image blur is calculated at the position of a photographed face (subject 80) selected through the method (3) having been explained in reference to the first embodiment, the photographed face may take up a great area of the image plane and in such a case, the CPU 21 may select the method (5) described above instead.

Figure 7:
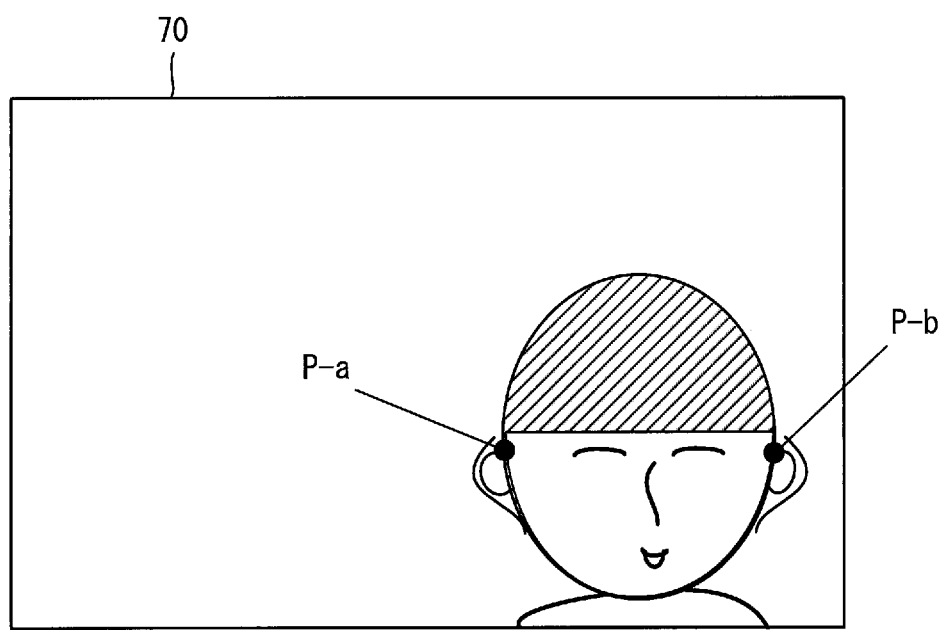

FIG. 7 illustrates variation 2 of the first embodiment. In reference to FIG. 7, an example in which a single representative position is selected from a plurality of candidates will be explained. FIG. 7 shows a face (subject) photographed to take up a great area of the image plane 70. The CPU 21 designates, for instance, two points, i.e., a position P-a at the left edge of the detected face and a position P-b at the right edge of the detected face as candidate positions.

The CPU 21 sets the two candidate positions as image blur calculation positions on the image plane 70. The angular blur calculation unit 201 individually calculates image blurs at the position P-a and the position P-b on the image plane 70. The angular blur calculation unit 201 further calculates an average of the plurality of image blurs having been calculated and then executes image blur correction based upon the image blur average value.

While the image blur average value may be calculated as, for instance, a simple average, it may instead be calculated as a weighted average.

Through variation 2 of the first embodiment described above, image blur correction can be executed for a face photographed to take up a large image area, so as to substantially equalize the extents of image blur at the two edges of the face. Through these measures, an image that looks natural to the user can be achieved even when image blurs on the left side and the right side of the face are different.

Second Embodiment

In reference to the second embodiment, an image blur occurring along a direction intersecting (direction different from) the direction along which an angular velocity has been detected will be explained.

The camera 1 may be a single lens reflex camera such as that shown in FIG. 1 or it may be a mirrorless camera that does not include a mirror 24.

Furthermore, the camera 1 may be configured as a camera with an integrated lens by integrating an interchangeable lens 3 with the camera body 2.

Moreover, the image-capturing device does not need to be embodied as a camera 1 and instead it may be configured as a lens barrel with an image-capturing sensor, a smart phone having an image-capturing function, or the like.

Figure 8:
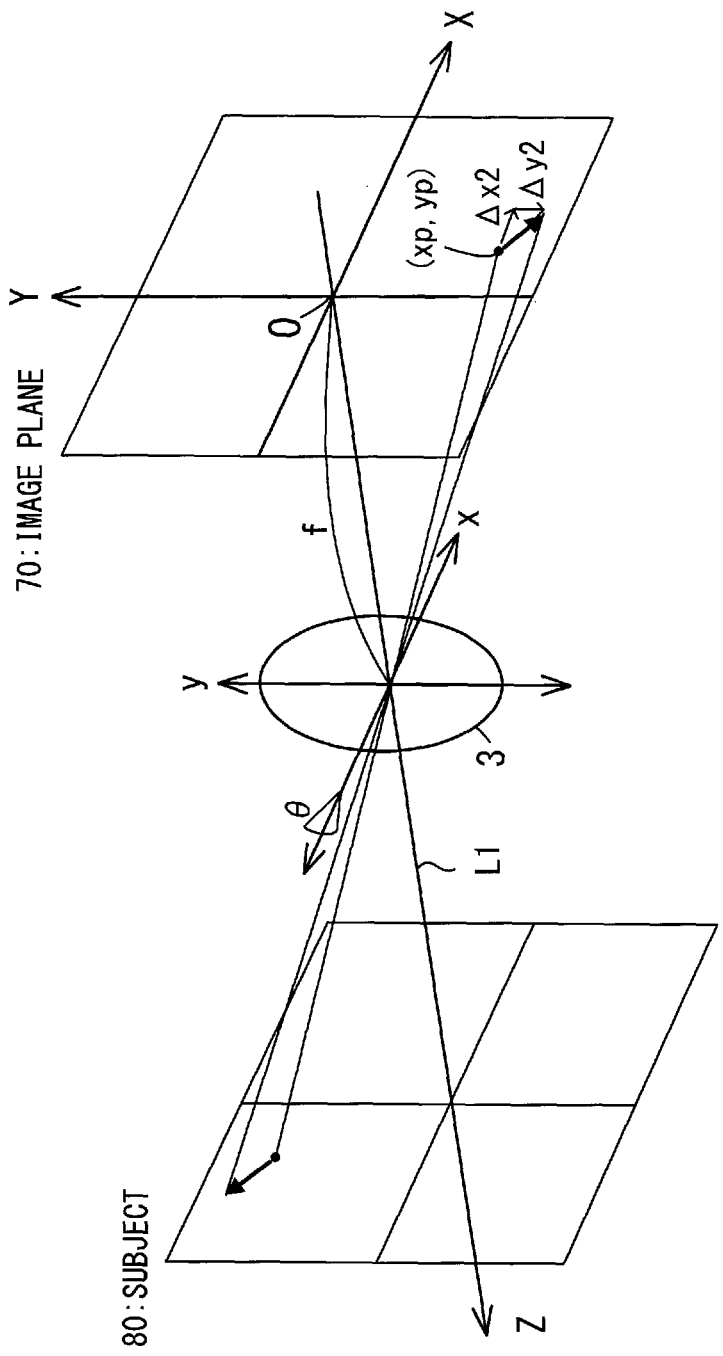

FIG. 8 illustrates the direction along which the angular velocity is detected by the angular velocity sensor 39a and an image blur occurring on an image plane 70 (the image-capturing surface of the image sensor 22) in a schematic representation. In FIG. 8, the point at which the image plane 70 and the optical axis L1 of the interchangeable lens 3 intersect is designated as the origin point of the coordinate system, with the Z axis representing the optical axis L1 of the interchangeable lens 3 and the XY plane representing the image plane 70. FIG. 8 shows that the optical axis L1 intersects the image-capturing surface at the center thereof. The interchangeable lens 3 and the subject 80 are located at positions further on the Z axis + side relative to the image plane 70. The angular velocity sensor 39a detects a rotational angle $\theta$ around, for instance, an axis (small-x axis) parallel to the X axis (along the pitch direction). When the subject 80 is located at a remote position, the reference sign f in FIGS. 3 and 4 represents the focal length.

As the camera 1 moves, the image of the subject 80, having been located at a coordinate point (xp, yp) on the image plane 70 prior to the movement, shifts toward the Y axis − side and also toward the X axis + side. Thus, the position of the image of the subject 80 following the camera movement is at a coordinate point (xp+$\Delta$x2, yp−$\Delta$y2).

The image blur $\Delta y2$ along the Y axis is expressed as mathematic equation (1), as has been explained earlier in reference to the first embodiment.

The image blur $\Delta x2$ along the X axis, on the other hand, is expressed as mathematic equation (3) below.

$$\Delta x2 = f \times xp/[(f^2+yp^2)^{1/2} \times \cos(\theta+\tan^{-1}(yp/f))] - xp \qquad (3)$$

It is to be noted that $\theta$ represents the rotational angle along the pitch direction (representing the angle of a hand movement, which is normally approximately 0.5°). When the subject 80 is located at a remote position, the reference sign f in FIGS. 3 and 4 represents the focal length of the interchangeable lens 3.

Equations (1) and (3) above indicate that since the rotational angle $\theta$ (hand movement angle) is normally approximately 0.5°, $\Delta x2$ can be assumed to be approximately equal to 0 ($\Delta x2 \approx 0$) as long as the focal length f is sufficiently large in relation to yp. In other words, only the image blur along the Y axis needs to be addressed and any image blur along the X axis can be disregarded when a rotational angle θ is detected in the pitch direction regardless of whether the position of the image of the subject 80 on the image plane 70 is at the center (the origin point in this example) of the image plane 70 or the position of the image of the subject 80 is set apart from the center, i.e., even over varying distances from the optical axis L1. This means that by executing image blur correction along the Y axis based upon the image blur calculated at, for instance, the center of the image plane 70, image blur in the image of the subject 80 at the center of the image plane 70 and the image blur in the image of the subject 80 at a position set apart from the center of the image plane 70 can both be corrected.

However, if the focal length f is not sufficiently large in comparison to yp, which may be the case when the interchangeable lens 3 is a wide-angle lens, Δx2 in equation (3) is not equal to 0 (Δx2≠0). Accordingly, when a rotational angle θ along the pitch direction is detected, an image blur along the X axis needs to be calculated as expressed in equation (3) above, in addition to the image blur along the Y axis calculated as expressed in (1). Otherwise, an image blur along the X axis corresponding to the image blur Δx2 in equation (3) would remain uncorrected. The extent of image blur Δx2 is bound to increase as the position at which the image blur is calculated moves closer to the periphery of the image plane 70, i.e., as the image height increases.

The CPU 21 determines an image blur calculation position on the image plane 70 in the same way as that described in reference to FIG. 1. Namely, the CPU 21 selects a method among the methods (1) through (4) explained earlier and sets an image blur calculation position on the image plane 70 through the selected method. The angular blur calculation unit 201 then calculates an image blur at the position set by the CPU 21. The blur correction optical system target position calculation unit 203 calculates an image blur quantity based upon the image blur calculated by the angular blur calculation unit 201 and the image blur calculated by the translational blur calculation unit 202.

It is to be noted that the image blur correction executed in the second embodiment includes correction along the Y axis executed when the camera 1 rotates along the pitch direction and correction along the X axis executed when the camera 1 rotates along the yaw direction.

In the explanation of the second embodiment provided above, correction is also executed along the X axis if the focal length f is not judged to be sufficiently large in comparison yp, in addition to the correction along the Y axis executed when the camera 1 has rotated along the pitch direction.

If the camera 1 has rotated along the yaw direction, correction similar to the correction described above needs to be executed along the Y axis. Namely, although an explanation will not be provided in reference to drawings, correction will also be executed along the Y axis if the focal length f is not judged to be sufficiently large in comparison to xp, in addition to the correction along the X axis executed when the camera 1 has rotated along the yaw direction.

In addition, if the camera 1 rotates both along the pitch direction and along the yaw direction, image blurs will occur simultaneously along the X axis and the Y axis due to the two rotational motions and accordingly, the image blurs attributable to the two rotational motions will be added together by appending the +/− signs to the individual image blurs in correspondence to the directions taken along the X axis and the Y axis. Then, based upon the image blur sums resulting from the adding operation, correction is individually executed along the X axis and along the Y axis.

It is to be noted that image blur calculated by the translational blur calculation unit 202 is assumed to be substantially constant regardless of which position on the image plane 70 (the image-capturing surface of the image sensor 22) is selected in the second embodiment, as in the first embodiment.

The second embodiment may be summarized as below.

The angular blur calculation unit 201 calculates an image blur by setting a specific position on the image plane 70 as an image blur calculation position. At this time, assuming that a rotational angle θ has been detected along, for instance, the pitch direction, an image blur along the X axis is calculated as expressed in (3), in addition to calculating an image blur along the Y axis, as expressed in (1).

The translational blur calculation unit 202 calculates an image blur by setting, for instance, the center of the image plane 70 as an image blur calculation position.

The blur correction optical system target position calculation unit 203 executes an adding operation to add together the image blurs calculated by the angular blur calculation unit 201 and the image blur calculated by the translational blur calculation unit 202 by appending +/− signs in correspondence to the directions taken along the X axis and the Y axis. It then calculates an image blur quantity representing the quantity of image blur at the particular position on the image plane 70 based upon the image blur sums along the X axis and along the Y axis resulting from the adding operation.

The following advantages and operations are achieved through the second embodiment described above.

(1) The blur correction device in the camera 1 includes a motion sensor 39 that detects movement of the device occurring along the Y axis, and a blur correction unit 21a that calculates, based upon an output from the motion sensor 39, the extent of blur in an image of a subject 80 formed at an image plane 70 via an image-capturing optical system. The blur correction unit 21a calculates a quantity of image blur occurring along the X axis intersecting the Y axis. Thus, image blur occurring along the X axis intersecting the Y axis along which the motion has been detected can be suppressed.

(2) The blur correction unit 21a in the blur correction device described in (1) above calculates an image blur along the Y axis and thus, image blur occurring along the Y axis, in which motion has been detected can be suppressed.

(3) The blur correction device described in (1) or (2) above further includes a CPU 21 that selects a position on the image plane 70 as a designated position. The blur correction unit 21a calculates the extent of image blur occurring along the X axis and along the Y axis based upon the designated position selected by the CPU 21 and a rotational angle detected along the Y axis by the motion sensor 39. As a result, optimal image blur suppression can be achieved even when the designated position on the image plane 70, set by the CPU 21, is other than the center of the image plane 70. Image blur correction can be ideally executed particularly when the focal length f of the interchangeable lens 3 is small (or when the field angle is wide, depending upon the relationship between the size of the image sensor 22 and the focal length f).

The following variation is also within the scope of the present invention, and one of the variations or a plurality of variations may be adopted in combination with the embodiment described above or in combination with an embodiment to be described later.

Variation 3

Figure 9:
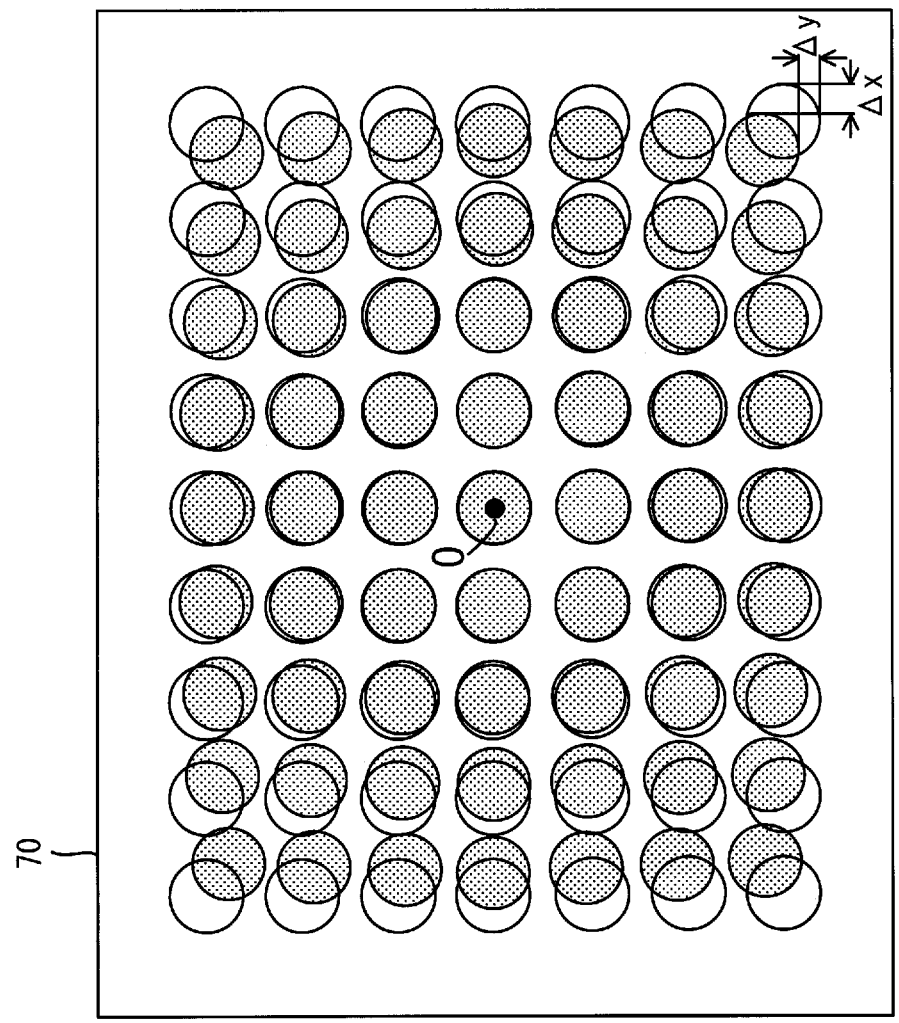

The CPU 21 may execute the image blur correction explained in reference to the second embodiment by taking into consideration optical distortion caused by the interchangeable lens 3. FIG. 9 presents an example of distortion (e.g., barrel distortion) that may be caused by the interchangeable lens 3. The numerous solid-line circles each represent an image of a subject 80 that would be formed assuming that the interchangeable lens 3 introduces no distortion. The numerous hatched circles, on the other hand, each represent an image of the subject 80 distorted due to barrel distortion attributable to the optical characteristics of the interchangeable lens 3.

While the extent of distortion attributable to the interchangeable lens 3 is bound to vary in correspondence to the lens design, distortion tends to occur to a greater extent at a wide-angle lens with a small focal length. This means that a greater extent of distortion will occur at a position further away from the optical axis L1 of the image-capturing optical system (further away from the center O of the image plane 70 when the center O of the image plane 70 is set in alignment with the optical axis L1). Such distortion will appear as a misalignment of a hatched circle relative to the corresponding solid-line circle in FIG. 9. In the example presented in FIG. 9, the extent of misalignment of the hatched circle relative to the solid-line circle is at its greatest at the position set apart from the center O of the image plane 70 by the greatest distance (i.e., at the greatest image height), and the misalignment occurs at, for instance, the lower right position by $\Delta x$ along the X axis and by $\Delta y$ along the Y axis.

The schematic illustration in FIG. 8 assumes that there is no distortion attributable to the image-capturing optical system, as represented by the solid-line circles in FIG. 9. This means that if the image blur correction was executed exactly as has been explained in reference to the second embodiment by setting the image blur calculation position on the image plane 70 at, for instance, a point set apart from the center O of the image plane 70 in conjunction with an interchangeable lens exhibiting distortion, the image blur would not be completely corrected.

Accordingly, when an interchangeable lens 3 with significant distortion is mounted at the camera body 2, image blur correction is executed as has been explained in reference to the second embodiment by assuming that distortion attributable to the image-capturing optical system, such as that represented by the hatched circles in FIG. 9, exists in variation 3 of the second embodiment.

Distortion information indicating specific positions, specific directions and specific extents of distortion to occur on the image plane 70, such as those represented by the hatched circles in FIG. 9, is available in advance as the design information pertaining to each interchangeable lens 3. Accordingly, distortion information pertaining to interchangeable lenses 3 that may be mounted at the camera body 2 is recorded in advance in the memory 28. Upon detecting that an interchangeable lens 3 with significant distortion is currently mounted, the CPU 21 reads out the corresponding distortion information from the memory 28 and uses the information in the image blur calculation operation executed as described above.

The blur correction optical system target position calculation unit 203 in the blur correction unit 21a executes an adding operation in correspondence to the X axis and the Y axis by appending +/− signs to the image blurs based upon the directions of the image blurs calculated by the angular blur calculation unit 201 and the translational blur calculation unit 202 and also based upon the directions indicated in the distortion information read out from the memory 28. Then, based upon the image blur sums corresponding to the X axis and the Y axis resulting from the adding operation, it calculates an image blur quantity at the position set on the image plane 70.

It is to be noted that while an explanation has been given on an example of image blur correction executed when barrel distortion has occurred, an image blur may be corrected in the same way when pincushion distortion has occurred.

Through variation 3, which applies to the second embodiment described above, optimal image blur correction can be achieved even in the presence of distortion.

In addition, even when a significant extent of optical distortion attributable to the interchangeable lens 3 occurs, optimal image blur suppression can be achieved at a position other than the center of the image plane 70.

Third Embodiment

In the third embodiment, an interchangeable lens 3A is mounted at a camera body 2A. The interchangeable lens 3A is distinguishable from the interchangeable lens 3 in that it includes an additional unit, i.e., a blur correction unit 40. A detection signal provided by the motion sensor 39 is transmitted to the blur correction unit 40.

The camera body 2A is distinguishable from the camera body 2 in that it includes an additional component, i.e., a motion sensor (motion detection unit, vibration detection unit) 31. A detection signal provided by the motion sensor 31 is transmitted to the CPU 21 (blur correction unit 21a). The motion sensor 31 has functions similar to those of the motion sensor 39.

When the interchangeable lens 3A equipped with the blur correction drive mechanism 37 is mounted at the camera body 2A, image blur correction executed by engaging the blur correction drive mechanism 37 at the interchangeable lens 3A in operation and image blur correction executed by engaging the blur correction drive mechanism 26 at the camera body 2A in operation are both employed in the third embodiment.

If, on the other hand, an interchangeable lens 3A that does not include a blur correction drive mechanism 37 is mounted at the camera body 2A, the blur correction drive mechanism 26 at the camera body 2A is engaged in operation so as to execute image blur correction similar to that in variation 1 of the first embodiment.

Figure 10:
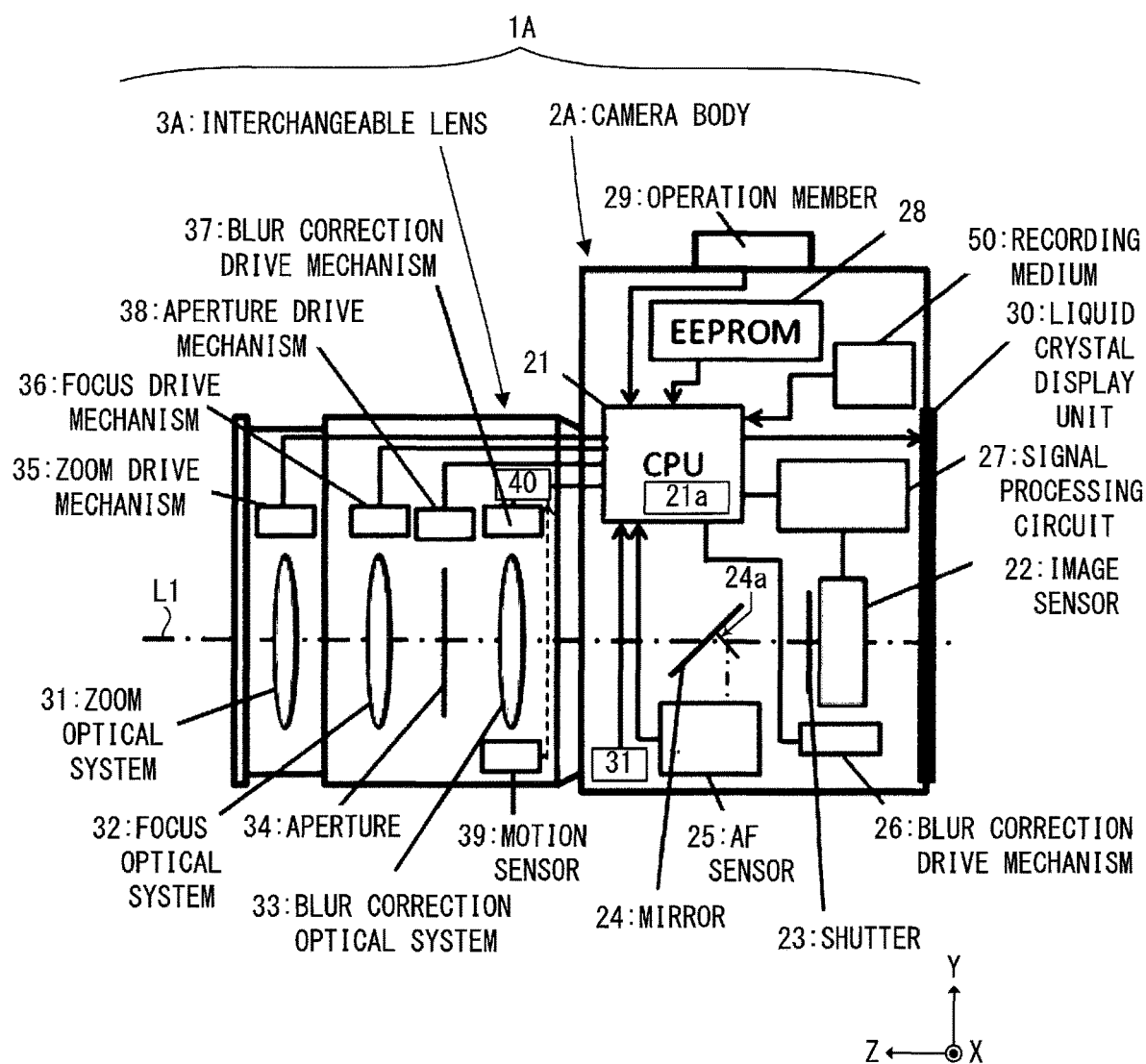

FIG. 10 illustrates the essential structure of a camera 1A in the third embodiment. The camera 1A is configured with a camera body 2A and an interchangeable lens 3A. The interchangeable lens 3A is mounted at the camera body 2A via a mount unit (not shown). As the interchangeable lens 3A is mounted at the camera body 2A, the camera body 2A and the interchangeable lens 3A become electrically connected, thereby enabling communication between the camera body 2A and the interchangeable lens 3A. The camera body 2A and the interchangeable lens 3A may communicate with each other through wireless communication.

In FIG. 10, the same reference signs are assigned to components similar to those in FIG. 1 so as to preclude the necessity for a repeated explanation thereof.

Figure 11:
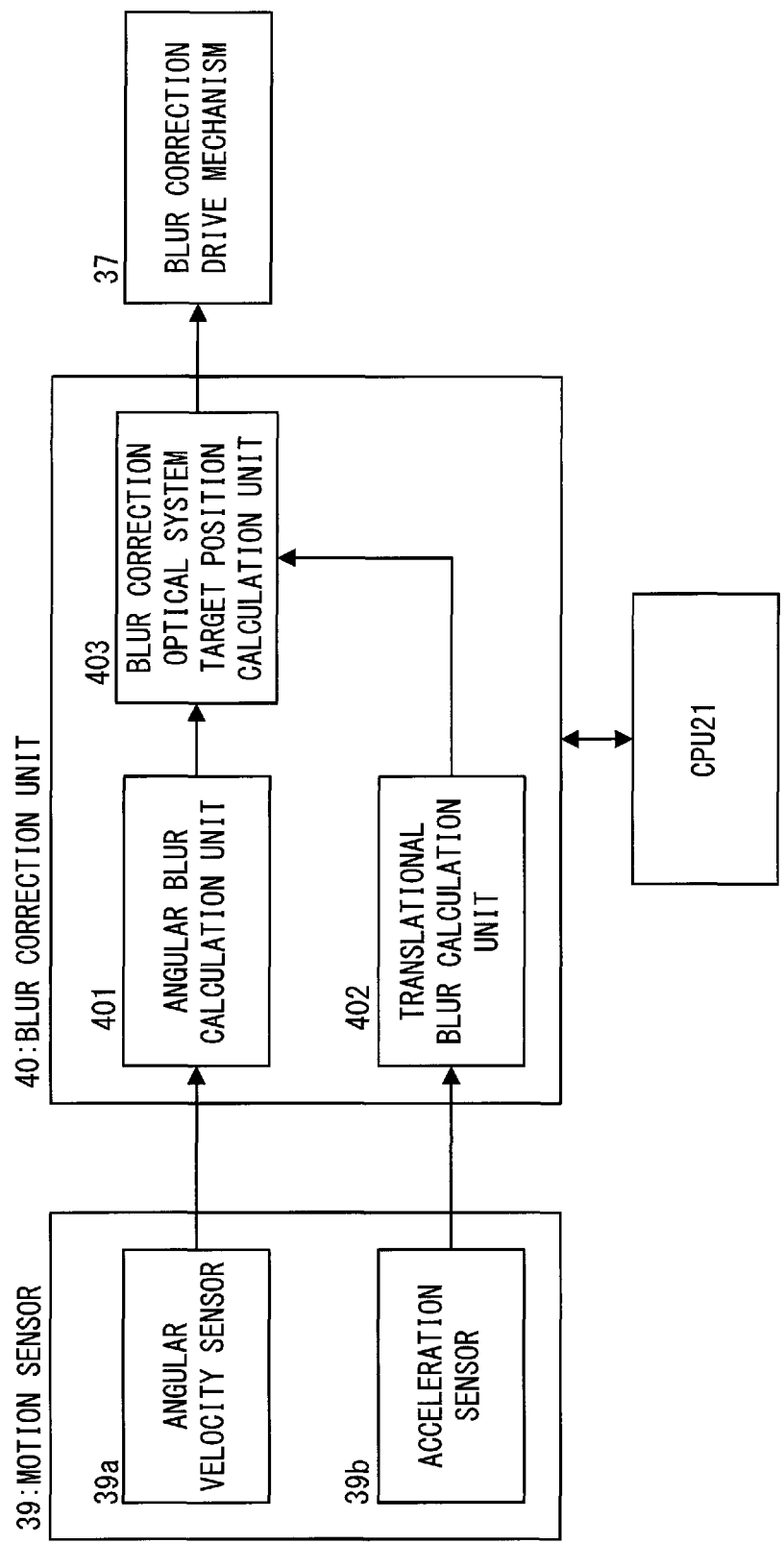

FIG. 11 illustrates the blur correction unit 40 at the interchangeable lens 3A. The blur correction unit 40 includes an angular blur calculation unit 401, a translational blur calculation unit 402 and a blur correction optical system target position calculation unit 403.

The angular blur calculation unit 401 calculates the quantity of an image blur occurring along the Y axis due to a rotational motion and an image blur along the X axis as needed, by using a detection signal provided by the angular velocity sensor 39a, indicating a rotational motion around an axis extending parallel to the X axis (along the pitch direction). In addition, the angular blur calculation unit 201 calculates the quantity of an image blur occurring along the X axis due to a rotational motion and also calculates the quantity of an image blur occurring along the Y axis as needed, by using a detection signal provided by the angular velocity sensor 39a, indicating a rotational motion around an axis extending parallel to the Y axis (along the yaw direction).

The translational blur calculation unit 402 calculates an image blur occurring along the X axis due to a translational motion by using a detection signal provided by the acceleration sensor 39b, indicating an acceleration along the X axis. In addition the translational blur calculation unit 402 calculates an image blur occurring along the Y axis due to a translational motion by using a detection signal provided by the acceleration sensor 39b, indicating an acceleration along the Y axis.

The blur correction optical system target position calculation unit 403 adds together the image blurs along the X axis and the Y axis, having been calculated by the angular blur calculation unit 401, and the image blurs along the X axis and the Y axis, having been calculated by the translational blur calculation unit 402, individually in correspondence to the X axis and the Y axis, so as to calculate image blurs along the X axis and along the Y axis.

In addition, the blur correction optical system target position calculation unit 403 calculates an image blur quantity representing the extent of image blur occurring at a position, which will be explained later, set on the image plane 70, based upon the image blur sums along the X axis and the Y axis resulting from the adding operation, the photographic magnification factor (calculated based upon the position of the zoom optical system 31) and the distance from the camera 1A to a subject 80 (calculated based upon the position of the focus optical system 32).

The blur correction optical system target position calculation unit 403 calculates a target position for the blur correction optical system 33 based upon the image blur quantity having been calculated in order to engage the blur correction drive mechanism 37 at the interchangeable lens 3A in operation.

The blur correction optical system target position calculation unit 403 then transmits a signal indicating the target position to the blur correction drive mechanism 37 at the interchangeable lens 3A.

It is to be noted that the camera 1A may be a single lens reflex camera such as that shown in FIG. 10 or it may be a mirrorless camera that does not include a mirror 24.

Furthermore, the camera 1 may be configured as a camera with an integrated lens by integrating an interchangeable lens 3A with the camera body 2A, as long as it includes the blur correction drive mechanism 26 that drives the image sensor 22 forward/backward and the blur correction drive mechanism 37 that drives the blur correction optical system 33 forward/backward.

Combination Image Blur Correction

The following is an explanation of combination image blur correction executed by combining image blur correction via the interchangeable lens 3A and image blur correction via the camera body 2A.

Image blur calculation by the angular blur calculation unit 201 and image blur calculation by the translational blur calculation unit 202 are executed in the same way as has been explained in reference to the first embodiment and the second embodiment.

However, they differ from the first embodiment and the second embodiment on the following points. One difference is that in the image blur correction executed via the interchangeable lens 3A, the center of the image plane 70 is selected as an image blur calculation position, whereas in the image blur correction executed via the camera body 2A, a position on the image frame 70 is selected as an image blur calculation position.

Another difference is that the image blur correction via the interchangeable lens 3A and the image blur correction via the camera body 2A are executed based upon a share ratio determined by the CPU 21 at the camera body 2A. The share ratio will be explained later.

Image Blur Calculation Positions

The CPU 21 sets, for instance, the center of the image plane 70 as an image blur calculation position in correspondence to which an image blur is to be calculated by the blur correction unit 40 at the interchangeable lens 3A and selects a specific position on the image plane 70 as an image blur calculation position in correspondence to which an image blur is to be calculated by the blur correction unit 21a at the camera body 2A. The angular blur calculation unit 401 at the interchangeable lens 3A, in turn, calculates a blur correction quantity (L) based upon the image blur at the center of the image plane 70 and the share corresponding to the interchangeable lens 3A indicated in the share ratio determined by the CPU 21. The angular blur calculation unit 201 at the camera body 2A calculates a blur correction quantity (B) based upon the image blur at the position other than the center of the image plane 70, having been set by the CPU 21, and the share corresponding to the camera body 2A indicated in the share ratio determined by the CPU 21.

The CPU 21 selects a position other than the center of the image plane 70 as an image blur calculation position through a method among the methods (1) through (4) explained in reference to the first embodiment.

When an image blur calculation position is set at the center of the image plane 70, an image blur $\Delta y1$ occurring along the Y axis is calculated as expressed in equation (2), as has been explained in reference to the first embodiment.

In addition, when a position other than the center of the image plane 70 is selected as an image blur calculation position, an image blur $\Delta y2$ occurring along the Y axis is calculated as expressed in equation (1), as has been explained in reference to the first embodiment.

Share Ratio

The CPU 21 determines a share ratio of the image blur correction executed via the interchangeable lens 3A and the image blur correction executed via the camera body 2A. The CPU 21 in the embodiment may set the share ratio to, for instance, 50:50. However, the ratio may be set to 70:30 or 40:60.

Assuming that the CPU 20 sets the share ratio to 50:50, the angular blur calculation unit 401 at the interchangeable lens 3A determines an image blur V(L) representing the share allocated to the interchangeable lens 3A, as expressed in equation (4) below. In the right side, $\Delta y1$ is multiplied by ½, since the share ratio is set at 50%.

$$V(L) = \Delta y \cdot 1/2 = f \times \tan \theta/2 \quad (4)$$

$\Delta y1$ is the image blur present along the Y axis at the center of the image plane 70. In addition, θ represents the rotational angle along the pitch direction (representing the angle of a hand movement, which is normally approximately 0.5°). When the subject 80 is located at a remote position, the reference sign f represents the focal length of the interchangeable lens 3A.

The angular blur calculation unit 201 at the camera body 2A, in turn, determines an image blur V(B) representing the share allocated to the camera body 2A as expressed in equation (5) below, assuming that the share ratio determined by the CPU 21 is 50:50.

$$V(B) = \Delta y \cdot 1/2 + d = f \times \tan \theta / 2 + d \qquad (5)$$

It is to be noted that d=Δy2−Δy1. Δy2 is the image blur present along the Y axis at the position other than the center of the image plane 70.

Based upon the image blur V(L) calculated by the angular blur calculation unit 401 and the image blur calculated by the translational blur calculation unit 402, the blur correction optical system target position calculation unit 403 at the interchangeable lens 3A calculates a target position for the blur correction optical system 33 to be taken for image blur correction executed by engaging the blur correction drive mechanism 37 at the interchangeable lens 3A in operation.

Based upon the image blur V(B) calculated by the angular blur calculation unit 201 and the image blur calculated by the translational blur calculation unit 202, the blur correction optical system target position calculation unit 203 at the camera body 2A calculates a target position for the image sensor 22 to be taken for image blur correction executed by engaging the blur correction drive mechanism 26 at the camera body 2A in operation.

The blur correction optical system target position calculation unit 403 at the interchangeable lens 3A also outputs a signal indicating the target position to the blur correction drive mechanism 37 at the interchangeable lens 3A. In addition, the blur correction optical system target position calculation unit 203 at the camera body 2A outputs a signal indicating the target position to the blur correction drive mechanism 26 at the camera body 2A.

In the third embodiment, image blur correction is executed based upon the image blur calculated by the angular blur calculation unit 401 in correspondence to the center of the image plane 70 through the image blur correction via the interchangeable lens 3A. In addition, image blur correction is executed based upon the image blur calculated by the angular blur calculation unit 201 in correspondence to the position other than the center of the image plane 70 through the image blur correction via the camera body 2A.

It is to be noted that the image blur correction executed in the third embodiment includes correction along the Y axis executed when the camera 1A rotates along the pitch direction and correction along the X axis executed when the camera 1A rotates along the yaw direction.

The explanation has been given above on correction along the Y axis executed when the camera 1A has rotated along the pitch direction, as an example representing the image blur correction executed in the third embodiment. If the camera 1A has also rotated along the yaw direction, correction similar to that described above needs to be executed along the X axis, as well.

Since correction along the Y axis executed when the camera 1A has rotated along the pitch direction and correction along the X axis executed when the camera 1A has rotated along the yaw direction are similar except for the directions along which the correction is executed, an explanation of the correction executed along the X axis will not be provided.

In addition, if the camera 1A has rotated both along the pitch direction and along the yaw direction, image blurs will occur simultaneously along the X axis and the Y axis due to the two rotational motions and accordingly, the image blurs attributable to the two rotational motions will be added together by appending +/− signs to the individual image blurs in correspondence to the directions taken along the X axis and the Y axis. Then, based upon the image blur sums resulting from the adding operation, correction will be individually executed along the X axis and along the Y axis.

It is to be noted that image blurs calculated by the translational blur calculation unit 202 and the translational blur calculation unit 402 in correspondence to different positions on the image plane 70 are assumed to be substantially constant in the third embodiment, as in the first embodiment and the second embodiment.

The third embodiment may be summarized as below.

The angular blur calculation unit 401 in the blur correction unit 40 at the interchangeable lens 3A calculates an image blur at the center of the image plane 70. The angular blur calculation unit 201 in the blur correction unit 21a at the camera body 2A calculates an image blur at a position other than the center of the image plane 70.

The angular blur calculation unit 401 at the interchangeable lens 3A calculates an image blur V(L) representing the share allocated to the interchangeable lens 3A (e.g., at a share ratio of 50%) by multiplying the image blur Δy1 at the center of the image plane 70 by ½, whereas the angular blur calculation unit 201 at the camera body 2A calculates an image blur V(B) representing the share allocated to the camera body 2A as V(B)=V(L)+d. d represents the difference between the image blur Δy2 at the position other than the center of the image plane 70 and Δy1.

The translational blur calculation unit 402 at the interchangeable lens 3A sets the image blur representing the share allocated to the interchangeable lens 3A (e.g., a share ratio of 50%) to, for instance, ½ of the image blur at the center of the image plane 70. The translational blur calculation unit 202 at the camera body 2A sets the image blur representing the share allocated to the camera body 2A to, for instance, ½ of the image blur at the center of the image plane 70.

The blur correction optical system target position calculation unit 403 at the interchangeable lens 3A executes an adding operation to add together the image blur V(L) calculated by the angular blur calculation unit 401 and the image blur calculated by the translational blur calculation unit 402 by appending +/− signs in correspondence to the directions taken along the X axis and the Y axis. It then calculates an image blur quantity representing the extent of image blur at the center of the image plane 70 based upon the image blur sums along the X axis and along the Y axis resulting from the adding operation.

The blur correction optical system target position calculation unit 203 at the camera body 2A executes an adding operation to add together the image blur V(B) calculated by the angular blur calculation unit 201 and the image blur calculated by the translational blur calculation unit 202 by appending +/− signs in correspondence to the directions taken along the X axis and the Y axis. It then calculates an image blur quantity representing the extent of image blur at the position other than the center of the image plane 70 based upon the image blur sums along the X axis and along the Y axis resulting from the adding operation.

The following advantages and operations are achieved through the third embodiment described above.

(1) The blur correction device in the camera 1A includes a motion sensor 39 that detects movement of the device, a blur correction unit 40 that calculates, based upon an output from the motion sensor 39, an image blur quantity representing blur quantity in an image of a subject 80 formed via an image-capturing optical system on an image plane 70, and a blur correction drive mechanism 37 that causes a blur correction optical system 33 to move along a direction in which the blur quantity is reduced based upon an output provided by the blur correction unit 40, all disposed at an interchangeable lens 3A. It further includes a motion sensor 31 that detects movement of the device, a blur correction unit 21b that calculates an image blur quantity representing the blur quantity in an image of the subject 80 formed on the image plane 70 via the image-capturing optical system, a blur correction drive mechanism 26 that causes an image sensor 22, which captures an image of the subject 80 on the image plane 70, to move along the direction in which the blur quantity is reduced based upon an output provided by the blur correction unit 21a, and a CPU 21 that sets a position on the image plane 70, all disposed at the camera body 2A.

The blur correction unit 40 at the interchangeable lens 3A calculates an image blur Δy1 based upon a first position (i.e., the center of a image plane 70) set in advance on the image plane 70 and movement detected by the motion sensor 39. The blur correction unit 40 sets an image blur V(L) representing the share allocated to the interchangeable lens 3A (e.g., a share ratio of 50%) to ½ of the image blur Δy1.

The blur correction unit 21b at the camera body 2A calculates an image blur Δy2 based upon a second position (a position other than the center) set by the CPU 21 and movement detected by the motion sensor 31, and calculates an image blur Δy1 based upon the first position (the center of the image plane) set in advance on the image plane 70 and the movement detected by the motion sensor 31. The blur correction unit 21b further calculates the difference d between the image blur Δy2 and the image blur Δy1. The angular blur calculation unit 201 sets an image blur V(B) representing the share to be allocated to the camera body 2A to V(L)+d.

As a result, the image blur can be suppressed in an optimal manner even when the designated position on the image plane 70 determined by the CPU 21 is other than the center of the image plane 70. Image blur correction can be ideally executed particularly when the focal length f of the interchangeable lens 3A is small (or when the field angle is wide, depending upon the relationship between the size of the image sensor 22 and the focal length f).

(2) In the blur correction device described in (1) above, the blur correction unit 40 at the interchangeable lens 3A outputs 50% of the image blur Δy1 to the blur correction drive mechanism 37, whereas the blur correction unit 21a at the camera body 2A outputs the remaining 50% of the image blur Δy1 and the difference d explained above to the blur correction drive mechanism 26. Thus, the distances over which the respective drive targets of the blur correction drive mechanism 26 and the blur correction drive mechanism 37 are to move can both be reduced in comparison to the distance over which either target will need to move when the blur correction drive mechanism 26 and the blur correction drive mechanism 37 are not used in combination.

It is to be noted that the CPU 21 may set the share ratio by allocating 100% to the image blur correction via the interchangeable lens 3A and 0% to the image blur correction via the camera body 2A. Under such circumstances, the angular blur calculation unit 401 at the interchangeable lens 3A will set the image blur V(L) representing the share to be allocated to the interchangeable lens 3A to 100% and the angular blur calculation unit 201 at the camera body 2A will set the image blur V(B) representing the share to be allocated to the camera body 2A to d. d represents the difference between the image blur Δy2 at the position other than the center of the image plane 70 and the image blur Δy1 at the center of the image plane 70.

The following variations are also within the scope of the present invention, and one of the variations or a plurality of variations may be adopted in combination with the embodiment described above or in combination with an embodiment to be described later.

Variation 4

The CPU 21 in variation 4, which applies to the third embodiment, selects, for instance, two positions (will be referred to as a first position and a second position) on the image plane 70 as image blur calculation positions. The angular blur calculation unit 401 at the interchangeable lens 3A calculates an image blur in correspondence to the first position set by the CPU 21. The angular blur calculation unit 201 at the camera body 2A calculates image blurs in correspondence to the first position and the second position set by the CPU 21. The CPU 21 selects the first position and the second position in correspondence to which image blurs are calculated through a method among the methods (1) to (4) having been explained earlier in reference to the first embodiment.

Variation 4 related to the third embodiment is distinguishable from the third embodiment in that neither the first position nor the second position may be the center of the image plane 70. However, variation 4 related to the third embodiment is similar to the third embodiment in that the CPU 21 determines a share ratio for the image blur correction via the interchangeable lens 3A and the image blur correction via the camera body 2A.

When either the first position or the second position designated as an image blur calculation position is located at the center of the image plane 70, the image blur Δy1 along the Y axis is calculated as expressed in equation (2), as has been explained in reference to the first embodiment.

In addition, when the first position or the second position designated as an image blur calculation position is not located at the center of the image plane 70, the image blur Δy2 along the Y axis is calculated as expressed in equation (1) having been explained in reference to the first embodiment.

Assuming that the CPU 21 sets the share ratio to 50:50, the angular blur calculation unit 401 at the interchangeable lens 3A determines an image blur V(L) representing the share allocated to the interchangeable lens 3A, as expressed in equation (6) below. In the right side, Δy2a is multiplied by ½, since the share ratio is set at 50%.

$$V(L) = \Delta y2a/2 \tag{6}$$

Δy2a is the image blur present along the Y axis at the first position different from the center of the image plane 70.

In addition, assuming that the share ratio determined by the CPU 21 is 50:50, the angular blur calculation unit 201 at the camera body 2A determines an image blur V(B) representing the share allocated to the camera body 2A, as expressed in equation (7) below.

$$V(B) = \Delta y2a/2 + d2 \tag{7}$$

It is to be noted that d2=Δy2b−Δy2a. Δy2b is the image blur present along the Y axis at the second position different from the center of the image plane 70.

Based upon the image blur V(L) calculated by the angular blur calculation unit 401 and the image blur calculated by the translational blur calculation unit 402, the blur correction optical system target position calculation unit 403 at the interchangeable lens 3A calculates a target position for the blur correction optical system 33 to be taken for image blur correction executed by engaging the blur correction drive mechanism 37 at the interchangeable lens 3A in operation.

In addition, based upon the image blur V(B) calculated by the angular blur calculation unit 201 and the image blur calculated by the translational blur calculation unit 202, the blur correction optical system target position calculation unit 203 at the camera body 2A calculates a target position for the image sensor 22 to be taken for image blur correction executed by engaging the blur correction drive mechanism 26 at the camera body 2A in operation.

The blur correction optical system target position calculation unit 403 at the interchangeable lens 3A also outputs a signal indicating the target position to the blur correction drive mechanism 37 at the interchangeable lens 3A. In addition, the blur correction optical system target position calculation unit 203 at the camera body 2A outputs a signal indicating the target position to the blur correction drive mechanism 26 at the camera body 2A.

In variation 4 related to the third embodiment, image blur correction is executed based upon the image blur calculated by the angular blur calculation unit 401 in correspondence to the first position set on the image plane 70 through the image blur correction via the interchangeable lens 3A. In addition, image blur correction is executed based upon the image blur calculated by the angular blur calculation unit 201 in correspondence to the second position set on the image plane 70 through the image blur correction via the camera body 2A.

It is to be noted that the image blur correction executed in variation 4 related to the third embodiment includes correction along the Y axis executed when the camera 1A rotates along the pitch direction and correction along the X axis executed when the camera 1A rotates along the yaw direction.

The explanation has been given above on correction along the Y axis executed when the camera 1A has rotated along the pitch direction, as an example representing the image blur correction executed in variation 4, which applies to the third embodiment. If the camera 1A has also rotated along the yaw direction, correction similar to that described above needs to be executed along the X axis, as well.

Since correction along the Y axis executed when the camera 1A has rotated along the pitch direction and correction along the X axis executed when the camera 1A has rotated along the yaw direction are similar except for the directions along which the correction is executed, an explanation of correction executed along the X axis will not be provided.

In addition, if the camera 1A has rotated both along the pitch direction and along the yaw direction, image blurs will occur simultaneously along the X axis and the Y axis due to the two rotational motions and accordingly, the image blurs attributable to the two rotational motions will be added together by appending +/− signs to the individual image blurs in correspondence to the directions taken along the X axis and the Y axis. Then, based upon the image blur sums resulting from the adding operation, correction will be individually executed along the X axis and along the Y axis.

It is to be noted that image blurs calculated by the translational blur calculation unit 202 and the translational blur calculation unit 402 in correspondence to different positions on the image plane 70 (the image-capturing surface of the image sensor 22) are assumed to be substantially constant in variation 4 related to the third embodiment, as in the first embodiment through the third embodiment.

Variation 4, which applies to the third embodiment, may be summarized as below.

The angular blur calculation unit 401 in the blur correction unit 40 at the interchangeable lens 3A calculates an image blur at the first position set on the image plane 70. The angular blur calculation unit 201 in the blur correction unit 21a at the camera body 2A calculates an image blur at second position set on the image plane 70.

The angular blur calculation unit 401 at the interchangeable lens 3A calculates an image blur V(L) representing the share allocated to the interchangeable lens 3A (e.g., at a share ratio of 50%) by multiplying the image blur Δy2a at the first position set on the image plane 70 by ½, whereas the angular blur calculation unit 201 at the camera body 2A calculates an image blur V(B) representing the share allocated to the camera body 2A as V(B)=V(L)+d2. d2 represents the difference between the image blur Δy2b at the second position on the image plane 70 and Δy2a.

The translational blur calculation unit 402 at the interchangeable lens 3A sets the image blur representing the share allocated to the interchangeable lens 3A (e.g., a share ratio of 50%) to, for instance, ½ of the image blur at the center of the image plane 70. The translational blur calculation unit 202 at the camera body 2A sets the image blur representing the share allocated to the camera body 2A to, for instance, ½ of the image blur at the center of the image plane 70.

The blur correction optical system target position calculation unit 403 at the interchangeable lens 3A executes an adding operation to add together the image blur V(L) calculated by the angular blur calculation unit 401 and the image blur calculated by the translational blur calculation unit 402 by appending +/− signs in correspondence to the directions taken along the X axis and the Y axis. It then calculates an image blur quantity representing the quantity of image blur at the first position on the image plane 70 based upon the image blur sums along the X axis and along the Y axis resulting from the adding operation.

The blur correction optical system target position calculation unit 203 at the camera body 2A executes an adding operation to add together the image blur V(B) calculated by the angular blur calculation unit 201 and the image blur calculated by the translational blur calculation unit 402 by appending +/− signs in correspondence to the directions taken along the X axis and the Y axis. It then calculates an image blur quantity representing the quantity of image blur at the second position set on the image plane 70 based upon the image blur sums along the X axis and along the Y axis resulting from the adding operation.

The following advantages and operations are achieved through variation 4 described above, which applies the third embodiment.

(1) The blur correction device in the camera 1A includes a motion sensor 39 that detects movement of the device, a blur correction unit 40 that calculates, based upon an output from the motion sensor 39, an image blur quantity representing the blur in an image of a subject 80 formed via an image-capturing optical system on an image plane 70, and a blur correction drive mechanism 37 that causes a blur correction optical system 33 to move along a direction in which the blur quantity is reduced based upon an output provided by the blur correction unit 40, all disposed at an interchangeable lens 3A. It further includes a motion sensor 31 that detects movement of the device, a blur correction unit 21a that calculates an image blur quantity representing the extent of blur in an image of the subject 80 formed on the image plane 70 via the image-capturing optical system, a blur correction drive mechanism 26 that causes an image sensor 22, which captures an image of the subject 80 on the image plane 70, to move along the direction in which the blur quantity is reduced based upon an output provided by the blur correction unit 21a, and a CPU 21 that sets a first position and a second position on the image plane 70, all disposed at the camera body 2A.

The blur correction unit 40 at the interchangeable lens 3A calculates an image blur Δy2a based upon the first position and movement detected by the motion sensor 39. The blur correction unit 40 sets an image blur V(L) representing the share allocated to the interchangeable lens 3A (e.g., a share ratio of 50%) to ½ of the image blur Δy2a.

The blur correction unit 21a at the camera body 2A calculates an image blur Δy2a based upon the first position and movement detected by the motion sensor 31 and also calculates image blur image blur Δy2b based upon the second position and the movement detected by the motion sensor 31. The blur correction unit 21b further calculates the difference d2 between an image blur Δy2a and the image blur Δy2b. The angular blur calculation unit 201 sets the image blur V(B) representing the share to be allocated to the camera body 2A to V(L)+d2.

As a result, the image blur can be suppressed in an optimal manner at the second position set by the CPU 21 located at a point other than the center of the image plane 70. Image blur correction can be ideally executed particularly when the focal length f of the interchangeable lens 3A is small (or when the field angle is wide, depending upon the relationship between the size of the image sensor 22 and the focal length f).

(2) In the blur correction device described in (1) above, the blur correction unit 40 at the interchangeable lens 3A outputs 50% of the image blur Δy2a to the blur correction drive mechanism 37, whereas the blur correction unit 21b at the camera body 2A outputs the remaining 50% of the image blur Δy2a and the difference d2 explained above to the blur correction drive mechanism 26. Thus, the distances over which the respective drive targets of the blur correction drive mechanism 26 and the blur correction drive mechanism 37 are to move can both be reduced in comparison to the distance over which either target will need to move when the blur correction drive mechanism 26 and the blur correction drive mechanism 37 are not used in combination.

It is to be noted that the CPU 21 may set the share ratio by allocating 100% to the image blur correction via the interchangeable lens 3A and 0% to the image blur correction via the camera body 2A. Under such circumstances, the angular blur calculation unit 401 at the interchangeable lens 3A will set the image blur V(L) representing the share to be allocated to the interchangeable lens 3A to 100% and the angular blur calculation unit 201 at the camera body 2A will set the image blur V(B) representing the share to be allocated to the camera body 2A to d2. d2 represents the difference between the image blur Δy2a at the first position different from the center of the image plane 70 and the image blur Δy2b at the second position different from the center of the image plane 70.

Variation 5

The blur correction unit 40 at the interchangeable lens 3A may execute the image blur correction operation based upon the image blur V(B) expressed in equation (5) or (7), and the blur correction unit 21a at the camera body 2A may execute the image blur correction operation based upon the image blur V(L) expressed in equation (4) or (6). Through variation 5, which applies to the third embodiment, the position set on the image plane 70 in order to calculate an image blur for purposes of image blur correction via the interchangeable lens 3A and the position set on the image plane 70 in order to calculate image blur for purposes of image blur correction via the camera body 2A may be reversed from those in the third embodiment and variation 4, which applies to the third embodiment.

Variation 6

While the explanation of the third embodiment or the explanation of variation 4, which applies to the third embodiment does not mention any details related to the second embodiment, correction similar to that having been explained in reference to the second embodiment will be executed in correspondence to the direction extending along the X axis, as well as correction along the Y axis executed when the camera 1A has rotated along the pitch direction, provided that the focal length f is not sufficiently large in comparison to yp. In such a case, the angular blur calculation unit 201 and the angular blur calculation unit 401 will each execute an adding operation by appending +/− signs to the image blurs in correspondence to the directions of the blurs, individually along the X axis and along the Y axis.

The same principle applies with respect to correction along the X axis executed when the camera 1A has rotated along the yaw direction. Namely, similar correction will be executed in the direction extending along the Y axis, as well as correction along the X axis executed when the camera 1A has rotated along the yaw direction, provided that the focal length f is not sufficiently large in comparison to xp. In such a case, the angular blur calculation unit 201 and the angular blur calculation unit 401 will each execute an adding operation by appending +/− signs to the image blurs in correspondence to the directions of the blurs, individually along the X axis and along the Y axis.

Fourth Embodiment

In reference to the fourth embodiment, image blur correction is executed exclusively via the interchangeable lens 3A in the camera 1A shown in FIG. 10. The camera 1A may be a single lens reflex camera such as that shown in FIG. 10 or it may be a mirrorless camera that does not include a mirror 24.

In addition, the camera 1A may be configured as a camera with an integrated lens by integrating an interchangeable lens 3A with the camera body 2A.

Image Blur Calculation Position

The CPU 21 at the camera body 2A in the fourth embodiment selects a position at which an image of a primary subject is likely to be present on the image plane 70 through, for instance, a method among the methods (1) through (4) having been described in reference to the first embodiment. The CPU 21 then transmits information indicating the position set on the image plane 70 to the blur correction unit 40 at the interchangeable lens 3A.

The timing with which the CPU 21 at the camera body 2A transmits the information indicating the image blur calculation position set on the image plane 70 to the blur correction unit 40 may be synced with, for instance, the timing with which the CPU 21 sets an image blur calculation position on the image plane 70 (timing with which an image blur calculation position is set for the first time or timing with which the image blur calculation position is updated).

The CPU 21 promptly provides the blur correction unit 40 with the position information mentioned above by, for instance, including the position information in information transmitted through routine communication between the camera body 2A and the interchangeable lens 3A or by including the position information in communication instructing image blur correction start transmitted from the camera body 2A to the interchangeable lens 3A.

The angular blur calculation unit 401 in the blur correction unit 40 calculates the image blur occurring at the position indicated in the information having been received from the CPU 21 and executes image blur correction based upon the image blur thus calculated.

When an image blur calculation position is set at the center of the image plane 70, an image blur $\Delta y1$ occurring along the Y axis is calculated as expressed in equation (2), as has been explained in reference to the first embodiment.

In addition, when a position other than the center of the image plane 70 is selected as an image blur calculation position, an image blur $\Delta y2$ occurring along the Y axis is calculated as expressed in equation (1), as has been explained in reference to the first embodiment.

It is to be noted that the image blur correction executed in the fourth embodiment includes correction along the Y axis executed when the camera 1A rotates along the pitch direction and correction along the X axis executed when the camera 1A rotates along the yaw direction.

Equations (1) and (2) mentioned above express correction executed along the Y axis when the camera 1A has rotated along the pitch direction. If the camera 1A has also rotated along the yaw direction, correction similar to that described above needs to be executed along the X axis, as well.

Since correction along the Y axis executed when the camera 1A has rotated along the pitch direction and correction along the X axis executed when the camera 1A has rotated along the yaw direction are similar except for the directions along which the correction is executed, an explanation of the correction executed along the X axis will not be provided.

In addition, if the camera 1A has rotated both along the pitch direction and along the yaw direction, image blurs will occur simultaneously along the X axis and the Y axis due to the two rotational motions and accordingly, the image blurs attributable to the two rotational motions will be added together by appending +/− signs to the individual image blurs in correspondence to the directions taken along the X axis and the Y axis. Then, based upon the image blur sums resulting from the adding operation, correction will be individually executed along the X axis and along the Y axis.

It is to be noted that image blurs calculated by the translational blur calculation unit 402 in correspondence to different positions on the image plane 70 (the image-capturing surface of the image sensor 22) are assumed to be substantially constant in the fourth embodiment, as in the third embodiment.

The fourth embodiment may be summarized as below.

The angular blur calculation unit 401 in the blur correction unit 40 at the interchangeable lens 3A calculates an image blur by selecting the position indicated by the CPU 21 at the camera body 2A as an image blur calculation position on the image plane 70.

The translational blur calculation unit 402 calculates an image blur at, for instance, the center of the image plane 70.

The blur correction optical system target position calculation unit 403 executes an adding operation to add together the image blurs calculated by the angular blur calculation unit 401 and the image blurs calculated by the translational blur calculation unit 402 by appending +/− signs in correspondence to the directions taken along the X axis and the Y axis. It then calculates an image blur quantity representing the quantity of image blur at the position on the image plane 70, which has been indicated by the CPU 21 at the camera body 2A, based upon the image blur sums along the X axis and along the Y axis resulting from the adding operation.

The following advantages and operations are achieved through the fourth embodiment described above.

(1) The blur correction device comprises a camera body 2A having disposed thereat an image sensor 22 that captures a subject image formed on an image plane 70 via an interchangeable lens 3A, a CPU 21 that determines a position on the image plane 70 and a CPU 21 that transmits information indicating the position determined by the CPU 21 to the interchangeable lens 3A, and the interchangeable lens 3A that includes a blur correction optical system 33 that executes blur correction, a blur correction unit 40 that receives position information transmitted from the camera body 2A, a blur correction unit 40 that calculates an image blur $\Delta y2$ based upon the position indicated in the position information received from the camera body 2A and movement detected by a motion sensor 39, and a blur correction drive mechanism 37 that causes the blur correction optical system 33 to move along a direction in which the image blur $\Delta y2$ is reduced. As a result, the image blur can be suppressed in an optimal manner at, for instance, a position other than the center of the image plane 70 selected by the CPU 21 at the camera body 2A. Image blur correction can be ideally executed particularly when the focal length f of the interchangeable lens 3A is small (or when the field angle is wide, depending upon the relationship between the size of the image sensor 22 and the focal length f).

(2) The blur correction unit 40 at the interchangeable lens 3A calculates an image blur $\Delta y2$ based upon an output from the motion sensor 39 and the focal length f of the interchangeable lens 3A. This means that the image blur $\Delta y2$ can be calculated in an optimal manner in correspondence to a position other than the center of the image plane 70, and optimal image blur suppression can be achieved based upon the image blur $\Delta y2$.

Fifth Embodiment

The fifth embodiment is implemented by using the camera 1A shown in FIG. 10, as is the fourth embodiment.

While image blur correction is executed in the fifth embodiment by exclusively engaging the blur correction drive mechanism 37 at the interchangeable lens 3A in operation, the fifth embodiment is distinguishable from the fourth embodiment in that the blur correction unit 21a in the CPU 21 at the camera body 2A and the blur correction unit 40 at the interchangeable lens 3A are both engaged in arithmetic operation.

The camera 1A may be a single lens reflex camera such as that shown in FIG. 10 or it may be a mirrorless camera that does not include a mirror 24.

In addition, the camera 1A may be configured as a camera with an integrated lens by integrating an interchangeable lens 3A with the camera body 2A.

Blur Calculation Positions

The CPU 21 at the camera body 2A selects a position on the image plane 70 at which an image of a primary subject is likely to be present through a method among, for instance, the methods (1) through (4) having been explained in reference to the first embodiment. The CPU 21 then designates the center of the image plane 70 as a first position and designates the position selected as described above as a second position.

Arithmetic Operation Executed on the Camera Body Side

The blur correction unit 21a in the CPU 21 calculates image blurs at the first position and the second position on the image plane 70.

More specifically, the angular blur calculation unit 201 calculates an image blur occurring along the Y axis due to a rotational motion and also the quantity of image blur along the X axis as needed by using a detection signal provided by the angular velocity sensor included in the motion sensor 31, indicating a rotational motion around an axis extending parallel to the X axis (along the pitch direction). In addition, the angular blur calculation unit 201 calculates an image blur occurring along the X axis due to a rotational motion and also an image blur occurring along the Y axis as needed by using a detection signal provided by the angular velocity sensor included in the motion sensor 31, indicating a rotational motion around an axis extending parallel to the Y axis (along the yaw direction).

When an image blur calculation position is set at the first position, an image blur $\Delta y1$ occurring along the Y axis is calculated as expressed in equation (2), as has been explained in reference to the first embodiment.

In addition, when the second position, which is other than the center of the image plane 70, is set as an image blur calculation position, an image blur $\Delta y2$ occurring along the Y axis is calculated as expressed in equation (1), as has been explained in reference to the first embodiment.

In the fifth embodiment, the blur correction unit 21a in the CPU 21 further calculates a ratio g of the image blur $\Delta y2$ at the second position to the image blur $\Delta y1$ at the first position as expressed in equation (78) below.

$$g = \Delta y2 / \Delta y1 \quad (8)$$

g above will be referred to as a correction coefficient g.

The CPU 21 transmits information indicating the correction coefficient g to the blur correction unit 40 at the interchangeable lens 3A. The CPU 21 may instead transmit information indicating the difference between $\Delta y2$ and $\Delta y1$ to the blur correction unit 40 at the interchangeable lens 3A in place of information indicating the ratio of $\Delta y2$ to $\Delta y1$.

The timing with which the CPU 21 at the camera body 2A transmits the information indicating the correction coefficient g to the blur correction unit 40 may be synced with, for instance, the timing with which the CPU 21 calculates the correction coefficient g after setting the first position and the second position, at which image blurs are to be calculated on the image plane 70, (they may be set for the first time or they may be updated).

The CPU 21 promptly provides the blur correction unit 40 with the information indicating the correction coefficient g mentioned above by, for instance, including the information indicating the correction coefficient g in information transmitted through routine communication between the camera body 2A and the interchangeable lens 3A or by including the information indicating the correction coefficient g in communication instructing image blur correction start transmitted from the camera body 2A to the interchangeable lens 3A.

Arithmetic Operation Executed on the Interchangeable Lens Side

The angular blur calculation unit 401 in the blur correction unit 40 calculates an image blur occurring along the Y axis due to a rotational motion and also an image blur along the X axis as needed by using a detection signal provided by the angular velocity sensor 39a, indicating a rotational motion around an axis extending parallel to the X axis (along the pitch direction) in the same way as the angular blur calculation unit 201 in the blur correction unit 21a at the camera body 2A calculates an image blur. In addition, the angular blur calculation unit 401 calculates an image blur occurring along the X axis due to a rotational motion and also an image blur along the Y axis by using a detection signal provided by the angular velocity sensor 39a, indicating a rotational motion around an axis extending parallel to the Y axis (along the yaw direction).

Image Blur Calculation Positions

The blur correction unit 40 in the fifth embodiment calculates an image blur occurring at a position matching the first position set by the CPU 21 at the camera body 2A, i.e., at the center of the image plane 70 in this case. Since the image blur is calculated at the center of the image plane 70, an image blur $\Delta y1$ along the Y axis is calculated as expressed in equation (2), as has been explained earlier in reference to the first embodiment.

The angular blur calculation unit 401 also calculates an image blur $\Delta y2$ along the Y axis at the second position on the image plane 70 by multiplying the image blur $\Delta y1$ along the Y axis by the correction coefficient g indicated in the information provided from the camera body 2A and received at a reception unit.

It is to be noted that if the information received from the camera body 2A indicates the difference between $\Delta y2$ and $\Delta y1$, the angular blur calculation unit 401 will calculate an image blur $\Delta y2$ by adding together the value indicated in the received information to the image blur $\Delta y1$.

The translational blur calculation unit 402 calculates an image blur occurring along the X axis due to a translational motion by using a detection signal provided by the acceleration sensor 39b, indicating an acceleration along the X axis. In addition the translational blur calculation unit 402 calculates an image blur occurring along the Y axis due to a translational motion by using a detection signal provided by the acceleration sensor 39b, indicating an acceleration along the Y axis.

The blur correction optical system target position calculation unit 403 adds together the image blurs along the X axis and the Y axis having been calculated by the angular blur calculation unit 401, and the image blurs along the X axis and the Y axis having been calculated by the translational blur calculation unit 402, individually in correspondence to the X axis and the Y axis, so as to calculate extents of image blurs along the X axis and along the Y axis.

In addition, the blur correction optical system target position calculation unit 403 calculates an image blur quantity representing the quantity of image blur occurring at the second position, set on the image plane 70, based upon the image blur sums along the X axis and the Y axis resulting from the adding operation, the photographic magnification factor (calculated based upon the position of the zoom optical system 31) and the distance from the camera 1A to a subject 80 (calculated based upon the position of the focus optical system 32).

The blur correction optical system target position calculation unit 403 calculates a target position for the blur correction optical system 33, to which the blur correction optical system 33 is to be driven along the direction in which the image blur quantity having been calculated is canceled out, in order to execute image blur correction by engaging the blur correction drive mechanism 37 at the interchangeable lens 3 in operation.

The blur correction optical system target position calculation unit 403 then transmits a signal indicating the target position to the blur correction drive mechanism 37 at the interchangeable lens 3A.

It is to be noted that the image blur correction executed in the fifth embodiment includes correction along the Y axis executed when the camera 1A rotates along the pitch direction and correction along the X axis executed when the camera 1A rotates along the yaw direction.

Equations (1) and (2) mentioned above express correction executed along the Y axis when the camera 1A has rotated along the pitch direction. If the camera 1A has also rotated along the yaw direction, correction similar to that described above needs to be executed along the X axis, as well.

Since correction along the Y axis executed when the camera 1A has rotated along the pitch direction and correction along the X axis executed when the camera 1A has rotated along the yaw direction are similar except for the directions along which the correction is executed, an explanation of the correction executed along the X axis will not be provided.

In addition, if the camera 1A has rotated both along the pitch direction and along the yaw direction, image blurs will occur simultaneously along the X axis and the Y axis due to the two rotational motions and accordingly, the image blurs attributable to the two rotational motions will be added together by appending +/− signs to the individual image blurs in correspondence to the directions taken along the X axis and the Y axis. Then, based upon the image blur sums resulting from the adding operation, correction will be individually executed along the X axis and along the Y axis.

It is to be noted that image blurs calculated by the translational blur calculation unit 402 in correspondence to different positions on the image plane 70 (the image-capturing surface of the image sensor 22) are assumed to be substantially constant in the fourth embodiment, as in the third embodiment.

The fifth embodiment may be summarized as below.

The angular blur calculation unit 201 in the blur correction unit 21a at the camera body 2A calculates image blurs $\Delta y1$ and $\Delta y2$ in correspondence to a first position (the center of the image plane 70) and a second position set on the image plane 70.

The blur correction unit 21a calculates a correction coefficient g indicating the ratio of the image blur $\Delta y2$ at the second position to the image blur $\Delta y1$ at the first position and transmits information indicating the correction coefficient g to the blur correction unit 40 at the interchangeable lens 3A.

The angular blur calculation unit 401 in the blur correction unit 40 at the interchangeable lens 3A calculates an image blur quantity at the first position (the center of the image plane 70) on the image plane 70. The angular blur calculation unit 401 further calculates an image blur quantity at the second position on the image plane 70 by multiplying the image blur at the first position by the correction coefficient g indicated in the information provided by the camera body 2A and received at a reception unit.

The translational blur calculation unit 402 in the blur correction unit 40 calculates an image blur at, for instance, the first position.

The blur correction optical system target position calculation unit 403 in the blur correction unit 40 executes an adding operation to add together image blurs at the second position and image blurs calculated by the translational blur calculation unit 402 by appending +/− signs in correspondence to the directions taken along the X axis and the Y axis. It then calculates an image blur quantity representing the quantity of image blur at the second position on the image plane 70.

The following advantages and operations are achieved through the fifth embodiment described above.

(1) The blur correction device comprises a camera body 2A at which an image sensor 22 that captures a subject image formed on an image plane 70 via an interchangeable lens 3A, a CPU 21 that determines a position on the image plane 70, a blur correction unit 21a that calculates image blurs $\Delta y1$ and $\Delta y2$ at a first position (the center of the image plane 70) set in advance on the image plane 70 and a second position determined by the CPU 21, based upon the first position, the second position and movement detected by a motion sensor 31, and a CPU 21 that transmits information indicating a correction coefficient g representing the ratio of the image blur $\Delta y2$ to the image blur $\Delta y1$ or information indicating the difference between the image blur $\Delta y1$ and the image blur $\Delta y2$ are disposed, and the interchangeable lens 3A that includes a blur correction optical system 33 that executes blur correction, a blur correction unit 40 that calculates an image blur $\Delta y1$ at a first position (the center of the image plane 70) at the image sensor 22 based upon the first position (the center of the image plane 70) and movement detected by a motion sensor 39, a blur correction unit 40 that receives the information from the camera body 2A, and a blur correction drive mechanism 37 that corrects the image blur $\Delta y1$ calculated by the blur correction unit 40 based upon the information having been received and causes the blur correction optical system 33 to move along a direction in which the image blur being corrected, is reduced. As a result, the blur correction unit 40 at the interchangeable lens 3A is able to suppress image blur in an optimal manner at, for instance, the second position determined by the CPU 21 at the camera body 2A. Image blur correction can be ideally executed particularly when the focal length f of the interchangeable lens 3 is small (or when the field angle is wide, depending upon the relationship between the size of the image sensor 22 and the focal length f).

(2) The blur correction unit 21a at the camera body 2A calculates image blurs $\Delta y1$ and $\Delta y2$ based upon an output provided by the motion sensor 31 and the focal length f of the interchangeable lens 3A, and the blur correction unit 40 at the interchangeable lens 3A calculates an image blur $\Delta y1$ based upon an output from the motion sensor 39 and the focal length f. This means that the blur correction unit 40 at the interchangeable lens 3A is able to calculate the image blur $\Delta y2$ at the second position other than the center of the image plane 70 in an optimal manner, and optimal image blur correction can be achieved based upon the image blur $\Delta y2$.

The fifth embodiment may be adopted in conjunction with variation 4, which applies to the third embodiment explained earlier. In such a case, image blur correction will be executed by engaging both the blur correction drive mechanism 26 at the camera body 2A and the blur correction drive mechanism 37 at the interchangeable lens 3A in operation, as in variation 4 related to the third embodiment. In addition, the blur correction unit 21a in the CPU 21 at the camera body 2A and the blur correction unit 40 at the interchangeable lens 3A will both be engaged in arithmetic operation as in the fifth embodiment.

The CPU 21 at the camera body 2A may transmit, for instance; (a) information indicating the first position at which an image blur is to be calculated on the image plane 70 and (b) information indicating the share ratio of the image blur correction via the interchangeable lens 3A and the image blur correction via the camera body 2A, to the blur correction unit 40 at the interchangeable lens 3A.

In this case, the blur correction unit 40 at the interchangeable lens 3A will first calculate an image blur at the first position on the image plane 70 and then determine an image blur V(L) representing the share allocated to the interchangeable lens 3A as expressed in equation (6).

The blur correction unit 21a at the camera body 2A will first calculate an image blur at the first position on the image plane 70 and an image blur at the second position on the image plane 70 and then will determine image blur V(B) representing the share allocated to the camera body 2A as expressed in equation (7).

The blur correction unit 40 at the interchangeable lens 3A will next execute image blur correction via the blur correction drive mechanism 37 at the interchangeable lens 3A engaged in operation by calculating a target position for the blur correction optical system 33 based upon the image blur V(L) having been calculated and the image blur calculated by the translational blur calculation unit 402.

In addition, the blur correction unit 21a at the camera body 2A will execute image blur correction via the blur correction drive mechanism 26 at the camera body 2A engaged in operation by calculating a target position for the image sensor 22 based upon the image blur (B) having been calculated and the image blur calculated by the translational blur quantity calculation unit 202.

In the embodiments and the variations thereof described above, image blur correction is executed at a position at which blur is to be suppressed. This means that while the image blur occurring at a position selected by the CPU 21 on the image plane 70 may be suppressed, image blur at other positions on the image plane 70 may remain uncorrected. Under such circumstances, image blur correction may be combined with image restoration achieved through image processing. The CPU 21 will transmit an instruction to the signal processing circuit 27 so as to engage the signal processing circuit 27 in image restoration processing through which image blur is rendered less noticeable by, for instance, applying intense edge enhancement to the data corresponding to the other positions in the image data generated by the signal processing circuit 27.

At least one of the embodiments and the variations thereof described above includes an input unit to which a blur quantity (movement quantity) representing the extent of blur originating in at least either the image-capturing optical system or the image sensor 22, is input. The blur quantity may be input from a motion sensor connected to the blur correction device or it may be input from the interchangeable lens or the camera body.

The blur correction device in at least one of the embodiments and the variations thereof may include a first calculation unit that calculates, based upon the blur quantity input via the input unit, an off-axis correction quantity (e.g., a second correction quantity) based upon which blur in the subject image occurring off the optical axis (displacement occurring due to a shaky hand movement at a coordinate position off the optical axis on the image-capturing surface) is corrected. The first calculation unit may be included in the CPU 21 at the camera body, may be disposed in a blur correction control unit different from the CPU at the camera body, may be disposed in the CPU at the interchangeable lens or may be disposed in a blur correction control unit different from the CPU at the interchangeable lens.

The blur correction device in at least one of the embodiments and the variations thereof described above includes a second calculation unit that calculates a second correction quantity different from the first correction quantity, to be used to correct blur in the subject image occurring on the optical axis (displacement attributable to a shaky hand movement occurring on the image-capturing surface on the optical axis). The second calculation unit may be the first calculation unit or it may be a different calculation unit. While the second correction quantity takes a value greater than that taken for the first correction quantity in the embodiments and the variations thereof, the present invention is not limited to this example. In addition, while the second correction quantity contains a component along a direction intersecting the direction corresponding to the first correction quantity, the present invention is not limited to this example. The second correction quantity may contain a component along a direction intersecting the direction of the blur quantity having been input.

The off-axis correction quantity simply needs to indicate the extent of displacement attributable to a shaky hand movement, occurring off the optical axis on the image-capturing surface, and it may be calculated as the extent of displacement (e.g., $\Delta y2$) at a coordinate position off the optical axis attributable to a shaky hand movement, or it may be calculated based upon the difference (e.g., yp) between extents of displacement at positions taken on the optical axis and off the optical axis attributable to a shaky hand movement, or based upon the ratio (e.g., $\Delta y1/\Delta y2$) of the extents of displacement at positions taken on the optical axis and off the optical axis attributable to a shaky hand movement. When calculating the off-axis correction quantity based upon the difference between the extents of displacement or based upon the ratio of the extents of displacement, information to be used for the calculation may be transmitted/received between the camera body and the interchangeable lens. The information to be used for the calculation may be, for instance, information indicating at least either the difference between the extents of displacement or the ratio of the extents of displacement, information indicating the extent of displacement ($\Delta y1$) attributable to a shaky hand movement occurring at a position taken on the optical axis, information specified by the user or a control unit, or the like.

The blur correction device in at least one of the embodiments and the variations thereof include a drive unit (the blur correction drive mechanism 26 or 37) that drives at least part (blur correction optical system 33) of the image-capturing optical system or the image sensor 22 based upon a correction quantity having been calculated. The drive unit drives a movable portion based upon at least either of the first correction quantity and the second correction quantity.

Provided that a blur correction drive mechanism is included in the interchangeable lens, information pertaining to a correction quantity indicating the extent of correction executed via the interchangeable lens may be transmitted to the camera body. The camera body, having received the information pertaining to the correction quantity is then able to correct the residual displacement, having been left uncorrected thus far, via a drive unit included in the camera body or through image processing. In addition, provided that a blur correction drive mechanism is included in the interchangeable lens, information pertaining to a correction quantity (indicating the extent by which the movable portion is driven, the share ratio of the correction share to be allocated to the camera body and the correction share to be allocated to the interchangeable lens, or the like) may be transmitted from the camera body to the interchangeable lens. The camera body, having the information pertaining to the correction quantity indicating the extent of correction executed via the interchangeable lens, is able to correct the residual displacement via the drive unit in the camera body or through image processing. Moreover, provided that a blur correction drive mechanism is included in the interchangeable lens, blur on the optical axis attributable to a shaky hand movement may be corrected at the interchangeable lens and blur off the optical axis attributable to a shaky hand movement may be corrected at the camera body. In such a case, since the blur on the optical axis entirely attributable to a shaky hand movement needs to be corrected via the interchangeable lens, as in the related art, and no information pertaining to correction of blur attributable to a shaky hand movement needs to be exchanged between the interchangeable lens and the camera body, a wide range of compatibility between interchangeable lenses and the camera body is assured.

When the drive unit drives the movable portion based upon either of the on-axis correction quantity and the off-axis correction quantity, image-capturing operation at the image sensor may be executed in combination with image processing. For instance, the image sensor may output an on-axis corrected image captured by driving the movable portion based upon the on-axis correction quantity and an off-axis corrected image captured by driving the movable portion based upon the off-axis correction quantity. In such a case, a single image may be generated in the camera body by using the on-axis corrected image and the off-axis corrected image. The image processing may be executed in the camera or it may be executed at an external device. In addition, image processing such as distortion correction may be adjusted based upon the off-axis correction quantity. For instance, if the off-axis correction quantity exceeds a predetermined value, the distortion correction effect may be reduced so as to prevent off-axis displacement attributable to a shaky hand movement from becoming worse through distortion correction.

The embodiments and the variations thereof described earlier may be modified as needed or they may be adopted in combination.

The disclosure of the following priority application is herein Incorporated by reference:
Japanese Patent Application No. 2017-72588 filed Mar. 31, 2017

REFERENCE SIGNS LIST 1,1A . . . camera
2, 2A . . . camera body
3, 3A . . . interchangeable lens
21 . . . CPU
21a, 40 . . . blur correction unit
22 . . . image sensor
26, 37 . . . blur correction drive mechanism
31, 39 . . . motion sensor
33 . . . blur correction optical system
70 . . . image plane
80 . . . photographic subject

The invention claimed is:

1. A blur correction device, comprising:
an input unit to which a blur quantity in an image sensor that captures a subject image formed via an image-capturing optical system, and a position in the image sensor used for an in-focus state detection of the subject, are input; and
a calculation unit that calculates, based upon a distance between the position input to the input unit and a center of the image sensor, an off-axis correction quantity for correcting blur in the subject image occurring at a position off an optical axis.

2. The blur correction device according to claim 1, wherein:
the calculation unit calculates the off-axis correction quantity by using at least one of: a distance from the position off the optical axis to the optical axis, a focal length of the image-capturing optical system and a subject distance.

3. The blur correction device according to claim 1, wherein:
the position off the optical axis is one of a plurality of candidate positions.

4. The blur correction device according to claim 1, wherein:
the position off the optical axis is a single representative position calculated based upon a plurality of candidate positions.

5. The blur correction device according to claim 1, wherein:
the position off the optical axis is set by taking into consideration at least one of: contrast and luminance.

6. The blur correction device according to claim 1, wherein:
the calculation unit calculates the off-axis correction quantity based upon an on-axis correction quantity corresponding to a position in the subject image taken on the optical axis and the position off the optical axis.

7. The blur correction device according to claim 1, wherein:
an on-axis blur quantity indicating an extent of blur in the subject image at a position on the optical axis is input to the input unit as the blur quantity; and
the calculation unit calculates the off-axis correction quantity based upon the on-axis blur quantity and the position off the optical axis.

8. The blur correction device according to claim 1, wherein:
the calculation unit calculates an on-axis correction quantity corresponding to a position in the subject image on the optical axis and the off-axis correction quantity; and
the blur correction device further comprises an output unit that outputs the on-axis correction quantity and the off-axis correction quantity.

9. The blur correction device according to claim 1, further comprising:
a detection unit that detects the blur quantity indicating the extent of blur originating in at least either the image-capturing optical system or the image sensor.

10. The blur correction device according to claim 1, further comprising:
a drive unit that drives at least part of the image-capturing optical system or the image sensor based upon the correction quantity calculated by the calculation unit.

11. An interchangeable lens that includes the blur correction device according to claim 1.

12. An image-capturing device that includes the blur correction device according to claim 1.

13. The blur correction device according to claim 1, wherein
   distortion information of the image-capturing optical system is input to the input unit; and the blur correction device further comprising:
   a determination unit that determines, in accordance with the distortion information, whether or not the calculation unit calculates the off-axis correction quantity.

14. The blur correction device according to claim 1, wherein
   the position in the image sensor used for the in-focus state detection of the subject is input to the input unit in predetermined intervals; and
   the calculation unit calculates the off-axis correction quantity upon input of the position to the input unit.

15. The blur correction device according to claim 1, wherein
   a focal length of the image-capturing optical system while the image sensor captures the subject is input to the input unit; and
   the calculation unit calculates the off-axis correction quantity based upon the focal length input to the input unit.

16. A blur correction device, comprising:
   an input unit to which a quantity of movement of a device that includes an image sensor that captures a subject image formed via an image-capturing optical system, and a position in the image sensor used for an in-focus state detection of the subject, are input; and
   a control unit that performs, upon a focal length of the image-capturing optical system being a first value, a control to drive a blur correction element, which corrects an image blur of the subject image, based upon the quantity of movement regardless of the position input to the input unit; and that performs, upon the focal length of the image-capturing optical system being a second value that is smaller than the first value, a control to drive the blur correction element based upon the quantity of the movement and a distance between the position input into the input unit and a center of the image sensor.

* * * * *